United States Patent
Lee et al.

(10) Patent No.: US 9,584,277 B2
(45) Date of Patent: *Feb. 28, 2017

(54) METHOD FOR TRANSMITTING COMMON REFERENCE SIGNAL IN DOWNLINK MIMO SYSTEM

(71) Applicant: LG ELECTRONICS INC., Seoul (KR)

(72) Inventors: Moon Il Lee, Gyeonggi-do (KR); Jae Hoon Chung, Gyeonggi-do (KR); Hyun Soo Ko, Gyeonggi-do (KR); Bin Chul Ihm, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

This patent is subject to a terminal disclaimer.

(21) Appl. No.: 14/547,925

(22) Filed: Nov. 19, 2014

(65) Prior Publication Data

US 2015/0078308 A1 Mar. 19, 2015

Related U.S. Application Data

(63) Continuation of application No. 13/147,795, filed as application No. PCT/KR2010/000801 on Feb. 9, 2010, now Pat. No. 8,937,902.

(30) Foreign Application Priority Data

Nov. 11, 2009 (KR) .................. 10-2009-0108578

(51) Int. Cl.
*H04L 5/00* (2006.01)
*H04L 27/26* (2006.01)

(52) U.S. Cl.
CPC .......... *H04L 5/0048* (2013.01); *H04L 5/005* (2013.01); *H04L 5/0023* (2013.01); *H04L 27/2607* (2013.01)

(58) Field of Classification Search
None
See application file for complete search history.

(56) References Cited

U.S. PATENT DOCUMENTS 8,937,902 B2 * 1/2015 Lee .................. H04L 5/0023
370/328
2008/0232325 A1 9/2008 Mehta et al.
(Continued)

FOREIGN PATENT DOCUMENTS

CN 1658528 8/2005
CN 101296030 10/2008
(Continued)

OTHER PUBLICATIONS

Samsung, "DL RS Designs for Higher Order MIMO," R1-090619, 3GPP TSG RAN WG1 #56, Feb. 2009, 7 pages.
Fujitsu, "DL Reference Signal Design for 8x8 MIMO in LTE-Advanced," R1-090706, 3GPP TSG-RAN1 #56, Feb. 2009, 12 pages.
LG Electronics, "Issues on DL-RS Design for LTE-A," R1-090787, 3GPP TSG RAN WG1 Meeting #56, Feb. 2009, 5 pages.
(Continued)

*Primary Examiner* — Brian Roberts
(74) *Attorney, Agent, or Firm* — Lee Hong Degerman Kang Waimey

(57) ABSTRACT

The present invention relates to a method for transmitting reference signals for measuring a channel in a downlink MIMO (Multi Input Multi Output) system. The method comprises the steps of: configuring, by a base station at which Nt transmit antennas are configured, Nt reference signals for channel measurement, where Nt≥1; and transmitting, by the base station, the Nt reference signals to a use equipment in subframes at a specific cycle. The specific cycle is configured to include more than one subframe.

20 Claims, 23 Drawing Sheets

Related U.S. Application Data

(60) Provisional application No. 61/151,150, filed on Feb. 9, 2009, provisional application No. 61/161,070, filed on Mar. 18, 2009, provisional application No. 61/163,014, filed on Mar. 24, 2009, provisional application No. 61/233,496, filed on Aug. 13, 2009.

(56) References Cited

U.S. PATENT DOCUMENTS

| | | |
|---|---|---|
| 2008/0260062 A1 | 10/2008 | Imamura |
| 2009/0046582 A1 | 2/2009 | Sarkar et al. |
| 2010/0008317 A1 | 1/2010 | Bhattad et al. |
| 2010/0080139 A1 | 4/2010 | Palanki et al. |
| 2010/0104034 A1 | 4/2010 | Nam et al. |
| 2010/0195748 A1 | 8/2010 | Nam et al. |
| 2010/0303013 A1 | 12/2010 | Khandekar et al. |

FOREIGN PATENT DOCUMENTS

| | | |
|---|---|---|
| JP | 2008109670 | 5/2008 |
| JP | 2008148105 | 6/2008 |
| KR | 10-0329972 | 5/2002 |
| KR | 10-0355327 | 10/2002 |
| KR | 1020080102148 | 11/2008 |
| WO | 2008093952 | 8/2008 |

OTHER PUBLICATIONS

The State Intellectual Property Office of the People's Republic of China Application Serial No. 201080007238.7, Office Action dated Jul. 23, 2013, 6 pages.

3rd Generation Partnership Project; Technical Specification Group Radio Access Network; Evolved Universal Terrestrial Radio Access (E-UTRA); Physical Channels and Modulation, 3GPP TS 36.211, V8.5.0, Dec. 2008, 82 pages.

Korean Intellectual Property Office Application No. 10-2009-0108578, Notice of Allowance dated Sep. 20, 2016, 7 pages.

European Patent Office Application Serial No. 10738785.4, Search Report dated Nov. 18, 2016, 9 pages.

CATT, "RS design for DL higher order MIMO in LTE-A", R1-090481, 3GPP TSG RAN WG1 meeting 55bis, Jan. 2009, 8 pages.

Samsung, "Discussions on DL RS Design for Higher Order MIMO", R1-090103, 3GPP TSG RAN WG1 #55bis, Jan. 2009, 3 pages.

Texas Instruments, "Common Reference Symbol Mapping/Signaling for 8 Transmit Antenna", R1-090591, 3GPP TSG RAN WG1 #56, Feb. 2009, 8 pages.

Motorola, "Common Reference Symbol Mapping/Signaling for 8 Transmit Antennas", R1-083224, 3GPP TSG RAN1 #54a , Aug. 2008, 5 pages.

* cited by examiner

Antenna port 5

● : CRS transmission(LTE-A C_port#0~7)

: LTE-A C_port#G1

: LTE-A C_port#G2

FIG. 21

| R0 |   | R1 |   | R0 |   | R1 |   |
|----|---|----|---|----|---|----|---|
| R2 |   | R3 |   | R2 |   | R3 |   |
|    |   |    |   |    |   |    |   |
| ×  |   | ×  |   |    | × |    |   |
| R1 |   | R0 |   | R1 |   | R0 |   |
|    |   |    |   |    |   |    |   |
|    | × |    |   | ×  |   |    | × |
| R0 |   | R1 |   | R0 |   | R1 |   |
| R3 |   | R2 |   | R3 |   | R2 |   |
| ×  |   | ×  |   |    | × |    |   |
| C4 |   | C5 |   | C4 |   | C5 |   |
| R1 |   | R0 |   | R1 |   | R0 |   |
|    | × |    |   | ×  |   |    | × |
| C6 |   | C7 |   | C6 |   | C7 |   |

FIG. 22

Subframe #k

Subframe #k+1

RB #n

| R0 |  | R1 |  | R0 |  | R1 |  |
|----|--|----|--|----|--|----|--|
|  |  |  |  |  |  |  |  |
|  |  |  |  |  |  |  |  |
|  |  | C |  |  |  | C |  |
| R1 |  | R0 |  | R1 |  | R0 |  |
|  |  |  |  |  |  |  |  |
| R0 |  | R1 |  | R0 |  | R1 |  |
|  |  |  |  |  |  |  |  |
|  |  | C |  |  |  | C |  |
| R1 |  | R0 |  | R1 |  | R0 |  |
|  |  |  |  |  |  |  |  |

: LTE-A CRS group 1

RB #n+1

| R0 |  | R1 |  | R0 |  | R1 |  |
|----|--|----|--|----|--|----|--|
|  |  |  |  |  |  |  |  |
|  |  |  |  |  |  |  |  |
|  |  | D |  |  |  | D |  |
| R1 |  | R0 |  | R1 |  | R0 |  |
|  |  |  |  |  |  |  |  |
| R0 |  | R1 |  | R0 |  | R1 |  |
|  |  |  |  |  |  |  |  |
|  |  | D |  |  |  | D |  |
| R1 |  | R0 |  | R1 |  | R0 |  |
|  |  |  |  |  |  |  |  |

: LTE-A CRS group 2

METHOD FOR TRANSMITTING COMMON REFERENCE SIGNAL IN DOWNLINK MIMO SYSTEM

CROSS-REFERENCE TO RELATED APPLICATIONS

This application is a continuation of U.S. patent application Ser. No. 13/147,795, filed on Aug. 3, 2011, now U.S. Pat. No. 8,937,902, which is the National Stage filing under 35 U.S.C. 371 of International Application No. PCT/KR2010/000801, filed on Feb. 9, 2010, which claims the benefit of earlier filing date and right of priority to Korean Application No. 10-2009-0108578, filed on Nov. 11, 2009, and also claims the benefit of U.S. Provisional Application Nos. 61/233,496, filed on Aug. 13, 2009, 61/163,014, filed on Mar. 24, 2009, 61/161,070, filed on Mar. 18, 2009 and 61/151,150, filed on Feb. 9, 2009, the contents of which are all hereby incorporated by reference herein in their entirety.

TECHNICAL FIELD

The present invention relates to a method for efficiently providing a reference signal in an environment in which antennas are added to an existing system in a Multiple Input Multiple Output (MIMO) communication system.

BACKGROUND ART

LTE Physical Structure

3rd Generation Project Partnership (3GPP) Long Term Evolution (LTE) supports a type 1 radio frame structure, which is applicable to Frequency Division Duplex (FDD), and a type 2 radio frame structure, which is applicable to Time Division Duplex (TDD).

FIG. 1 shows the structure of a type 1 radio frame. The type 1 radio frame includes 10 subframes, each of which consists of two slots.

FIG. 2 shows the structure of a type 2 radio frame. The type 2 radio frame includes two half-frames, each of which is composed of five subframes, a Downlink Pilot Time Slot (DwPTS), a Guard Period (GP), and an Uplink Pilot Time Slot (UpPTS), in which one subframe consists of two slots. The DwPTS is used for initial cell search, synchronization, and channel estimation at a User Equipment (UE). The UpPTS is used for channel estimation and uplink transmission synchronization of the UE at a Base Station (BS). The GP is used to remove interference occurring in uplink due to a multipath delay of a downlink signal between the uplink and a downlink. Meanwhile, one subframe consists of two slots regardless of the radio frame type.

FIG. 3 shows the structure of an LTE downlink slot. As shown in FIG. 3, a signal transmitted in each slot can be described by a resource grid including $N_{RB}^{DL} N_{SC}^{RB}$ subcarriers and $N_{symb}^{DL}$ Orthogonal Frequency Division Multiplexing (OFDM) symbols. Here, $N_{RB}^{DL}$ represents the number of Resource Blocks (RBs) in downlink, $N_{SC}^{RB}$ represents the number of subcarriers constituting one RB, and $N_{symb}^{DL}$ represents the number of OFDM symbols in one downlink slot.

FIG. 4 shows the structure of an LTE uplink slot. As shown in FIG. 8, a signal transmitted in each slot can be described by a resource grid including $N_{RB}^{UL} N_{SC}^{RB}$ subcarriers and $N_{symb}^{UL}$ OFDM symbols. Here, $N_{RB}^{UL}$ represents the number of RBs in uplink, $N_{SC}^{RB}$ represents the number of subcarriers constituting one RB, and $N_{symb}^{UL}$ represents the number of OFDM symbols in one uplink slot.

A Resource Element (RE) is a resource unit defined as an index (a, b) in the uplink slot and the downlink slot and represents one subcarrier and one OFDM symbol. Here, 'a' is an index on a frequency axis and 'b' is an index on a time axis.

FIG. 5 shows the structure of a downlink subframe. In FIG. 5, a maximum of three OFDM symbols located at a front portion of a first slot within one subframe corresponds to a control region allocated to a control channel. The other OFDM symbols correspond to a data region allocated to a Physical Downlink Shared Channel (PDSCH). Examples of downlink control channels used in 3GPP LTE include a Physical Control Format Indicator Channel (PCFICH), a Physical Downlink Control Channel (PDCCH), a Physical Hybrid automatic repeat request Indicator Channel (PHICH), etc.

Definition of MIMO Technology

MIMO is an abbreviation for Multiple-Input Multiple-Output and refers to a method of improving data transmission/reception efficiency using multiple transmission antennas and multiple reception antennas, instead of a conventional method employing one transmission antenna and one reception antenna. In other words, MIMO technology allows a transmitter or a receiver of a wireless communication system to use multiple antennas, so that capacity or performance can be improved. Here, MIMO refers to multiple antennas.

In order to receive a message, MIMO technology is not dependent on a single antenna path. Instead, the MIMO technology applies a technique of completing the received whole message by gathering data fragments received via several antennas. Since the MIMO technology can improve a data transmission rate in a specific range or increase a system range at a specific data transmission rate, it is the next generation mobile communication technology widely usable for mobile communication terminals, relays, etc. Attention is being paid to this technology as a next-generation technology capable of overcoming limitations in mobile communication transmission capacity that has become a critical situation due to expansion of data communication.

FIG. 6 shows the configuration of a general MIMO communication system. As shown in FIG. 6, if the numbers of transmission and reception antennas are simultaneously increased to $N_T$ and $N_R$, respectively, a theoretical channel transmission capacity is increased in proportion to the number of antennas, unlike the case where only either a transmitter or a receiver uses multiple antennas. Accordingly, it is possible to increase transmission rate and to remarkably improve frequency efficiency. Theoretically, the transmission rate according to an increase in channel transmission capacity can be increased by an amount obtained by multiplying an increase rate $R_i$ indicated in the following Equation 1 by a maximum transmission rate $R_o$ in case of using one antenna.

$$R_i = \min(N_T, N_R) \quad \text{[Equation 1]}$$

For example, in a MIMO communication system using four transmission antennas and four reception antennas, it is possible to theoretically obtain a transmission rate which is four times a transmission rate of a single antenna system. After an increase in the theoretical capacity of the MIMO system was first proved in the mid-1990s, various techniques for substantially improving data transmission rate have been actively developed. Several of these techniques have already been incorporated in a variety of wireless communication standards such as the 3$^{rd}$ generation mobile communication and the next-generation wireless local area network.

Active research up to now related to the MIMO technology has focused upon a number of different aspects, including research into information theory related to the computation of MIMO communication capacity in various channel environments and in multiple access environments, research into wireless channel measurement and model derivation of a MIMO system, and research into space-time signal processing technologies for improving transmission reliability and transmission rate.

UE-Specific Reference Signal Allocation Scheme in 3GPP LTE Downlink System

In the structure of the radio frame applicable to FDD out of the above-described radio frame structures supported by the 3GPP LTE, one frame is transmitted during a duration of 10 msec. One frame consists of 10 subframes, each of which has a duration of 1 msec. One subframe consists of 14 or 12 OFDM symbols. The number of subcarriers selected in one OFDM symbol can be one of 128, 256, 512, 1024, 1536, and 2048.

FIG. 7 shows the structure of a UE-specific downlink Reference Signal (RS) in a subframe using a normal Cyclic Prefix (CP) in which one Transmission Time Interval (TTI) has 14 OFDM symbols. In FIG. 7, 'R5' denotes a UE-specific RS and 'l' denotes a position of an OFDM symbol in a subframe.

FIG. 8 illustrates the structure of a UE-specific downlink RS in a subframe using an extended CP in which one TTI has 12 OFDM symbols.

FIGS. 9 to 11 show the structures of UE-common downlink RSs for systems having 1Tx, 2Tx, and 4Tx, respectively, when one TTI has 14 OFDM symbols. In FIGS. 9 to 11, R0, R1, R2, and R3 represent pilot symbols for transmission antenna port 0, transmission antenna port 1, transmission antenna port 2, and transmission antenna port 3, respectively. To eliminate interference with the other transmission antennas except for the transmission antennas transmitting the pilot symbols, no signals are transmitted in subcarriers where the pilot symbols of the respective transmission antennas are used.

The UE-specific downlink RSs shown in FIGS. 7 and 8 may be simultaneously used together with the UE-common downlink RSs shown in FIGS. 9 to 11. For example, the UE-common downlink RSs shown in FIGS. 9 to 11 may be used in OFDM symbols 0, 1, and 2 of a first slot in which control information is transmitted, and UE-specific downlink RSs may be used in the other OFDM symbols. If a predefined sequence (e.g. Pseudo-Random (PN) sequence, m-sequence, etc.) is multiplied by a downlink RS according to each cell before transmission, channel estimation performance in a receiver can be improved by reducing interference of a signal of a pilot symbol received from a neighboring cell. The PN sequence is applied in units of OFDM symbols in one subframe. Different PN sequences may be applied according to a cell ID, a subframe number, an OFDM symbol position, and a UE ID.

As an example, it can be understood that, in the structure of a pilot symbol in one transmission antenna (1Tx) shown in FIG. 9, two pilot symbols for 1Tx are used with respect to a specific OFDM symbol including pilot symbols. The 3GPP LTE system includes a variety of bandwidths ranging from 60 RBs to 110 RBs. Accordingly, the number of pilot symbols for one transmission antenna in one OFDM symbol including a pilot symbol is 2×$N_{RB}$ and a sequence multiplied by a downlink RS in each cell should have a length of 2×$N_{RB}$. Here, $N_{RB}$ denotes the number of RBs corresponding to a bandwidth and the sequence may be a binary sequence or a complex sequence. One example of the complex sequence is indicated as r(m) in the following Equation 2.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 2]}$$
$$m = 0, 1, \ldots, 2N_{RB}^{max} - 1$$

In the above Equation 2, $N_{RB}^{max}$ represents the number of RBs corresponding to a maximum bandwidth and may be 110 according to the above description, and c represents a PN sequence and may be defined as a length-31 Gold sequence. In case of a UE-specific downlink RS, Equation 2 may be expressed by the following Equation 3.

$$r(m) = \frac{1}{\sqrt{2}}(1 - 2 \cdot c(2m)) + j\frac{1}{\sqrt{2}}(1 - 2 \cdot c(2m+1)), \quad \text{[Equation 3]}$$
$$m = 0, 1, \ldots, 2N_{RB}^{PDSCH} - 1$$

In Equation 3, $N_{RB}^{PDSCH}$ represents the number of RBs corresponding to downlink data allocated to a specific UE. Therefore, according to the amount of downlink data allocated to a UE, the length of the sequence may vary.

A system evolving from an LTE system is referred to as a 3GPP LTE-Advanced (hereinafter, LTE-A) system. If a BS transmits an RS to a UE in the LTE-A system, a method for minimizing RS overhead while minimizing an influence on the existing LTE UE needs to be provided.

DETAILED DESCRIPTION OF THE INVENTION

Technical Problems

An object to be achieved by the present invention is to provide the structure of a UE-specific downlink RS which enables transmission of a plurality of data streams.

Technical problems to be solved by the present invention are not limited to the above-mentioned technical problems, and other technical problems not mentioned above can be clearly understood by one skilled in the art from the following description.

Means for Solving the Problems

In an aspect of the present invention for solving these problems, a method for transmitting a Reference Signal (RS) for channel measurement in a downlink Multiple Input Multiple Output (MIMO) system which supports a first user equipment and a second user equipment, wherein the first user equipment supports N base station transmission antennas among a total of M base station transmission antennas and the second user equipment supports the M (where M>N) base station transmission antennas, includes grouping, at a base station, subframes or Resource Blocks (RBs) of a certain number to transmit Common Reference Signals (CRSs) for the M transmission antennas, and transmitting the subframes or RBs of the certain number to the second user equipment, wherein the grouped subframes or RBs of the certain number are transmitted to the second user equipment at a specific cycle, and CRSs for different transmission antenna ports corresponding to the quotient of M divided by the certain number are mapped to the subframes or RBs of the certain number.

The specific cycle may be determined based on an interval between a first transmitted subframe among the grouped subframes of the certain number and a first transmitted subframe among grouped subframes of a certain number of a next cycle.

The specific cycle may be determined based on an interval between a first transmitted subframe among the grouped subframes of the certain number and a last transmitted subframe among grouped subframes of a certain number of a next cycle.

The subframes of the certain number may be contiguous on a time axis.

The subframes of the certain number may be separated from each other on a time axis by a prescribed offset.

N may be 4, M may be 8, and the certain number may be 2.

Patterns of CRSs in subframes grouped according to the cycle may be different.

In another aspect of the present invention, a method for transmitting a Reference Signal (RS) for channel measurement in a downlink Multiple Input Multiple Output (MIMO) system which supports a first user equipment and a second user equipment, wherein the first user equipment supports N transmission antennas among a total of M transmission antennas and the second user equipment supports the M (where M>N) transmission antennas, includes grouping, at a base station, Resource Blocks (RBs) of a certain number in a subframe to transmit Common Reference Signals (CRSs) for the M transmission antennas, and transmitting the subframe to the second user equipment, wherein CRSs for different transmission antenna ports among M transmission antenna ports are mapped to the RBs.

The number of transmission antenna ports allocated to each RB among the M transmission antenna ports may be different.

N may be 4, M may be 8, and the certain number may be 2.

In a further aspect of the present invention, a method for transmitting a Reference Signal (RS) for channel measurement in a downlink Multiple Input Multiple Output (MIMO) system which supports a first user equipment and a second user equipment, wherein the first user equipment supports N transmission antennas among a total of M transmission antennas and the second user equipment supports the M (where M>N) transmission antennas, includes grouping, at a base station, subframes of a certain number and Resource Blocks (RBs) of a specific number included in each of the subframes of the certain number to transmit Common Reference Signals (CRSs) for the M transmission antennas, and transmitting the subframes of the certain number to the second user equipment, wherein the grouped subframes of the certain number are transmitted to the second user equipment at a specific cycle, and CRSs for the M transmission antennas are distributively mapped to the RBs.

The specific cycle may be determined based on an interval between a first transmitted subframe among the grouped subframes of the certain number and a first transmitted subframe among grouped subframes of a certain number of a next cycle.

The specific cycle may be determined based on an interval between a first transmitted subframe among the grouped subframes of the certain number and a last transmitted subframe among grouped subframes of a certain number of a next cycle.

The subframes of the certain number may be contiguous on a time axis.

The subframes of the certain number may be separated from each other on a time axis by a prescribed offset.

N may be 4, M may be 8, and the certain number may be 2.

RSs for the M transmission antenna ports may be mapped to each of the subframes and RSs for different antenna ports among the M transmission antenna ports may be mapped to each of the RBs of the specific number included in each of the subframes.

RSs for different antenna ports among the M transmission antenna ports may be mapped to each of the RBs.

Effects of the Invention

According to embodiments of the present invention, pilot symbols can be efficiently transmitted to both a UE of an existing system and a UE added to a new system.

The effects of the present invention are not limited to the above-mentioned effects, and other effects not mentioned above can be clearly understood by one skilled in the art from the following description.

BRIEF DESCRIPTION OF THE DRAWINGS

FIG. 21 is a diagram showing transmission of LTE-A C_ports #0~7 using one subframe;

FIG. 22 is a diagram showing an RS structure when transmitting LTE-A C_ports #0~7 using a plurality of subframes according to an embodiment of the present invention;

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out. The following detailed description includes detailed matters to provide full understanding of the present invention. However, it will be apparent to those skilled in the art that the present invention can be carried out without the detailed matters. For example, although the following description will be made based on some terminology, the following description will not be limited to such terminology and other terminology may be designated as same meaning. Also, the same reference numbers will be used throughout the drawings and the specification to refer to the same or like parts.

Throughout this specification, when an element is referred to as "includes" a component, it does not preclude another component but may further include the other component unless the context clearly indicates otherwise. Also, as used herein, the terms " . . . unit", " . . . device", " . . . module", etc., denote a unit of processing at least one function or operation, and may be implemented as hardware, software, or a combination of hardware and software.

Prior to a description of the structure of a pilot symbol, types of an RS will now be described.

Figure 12:
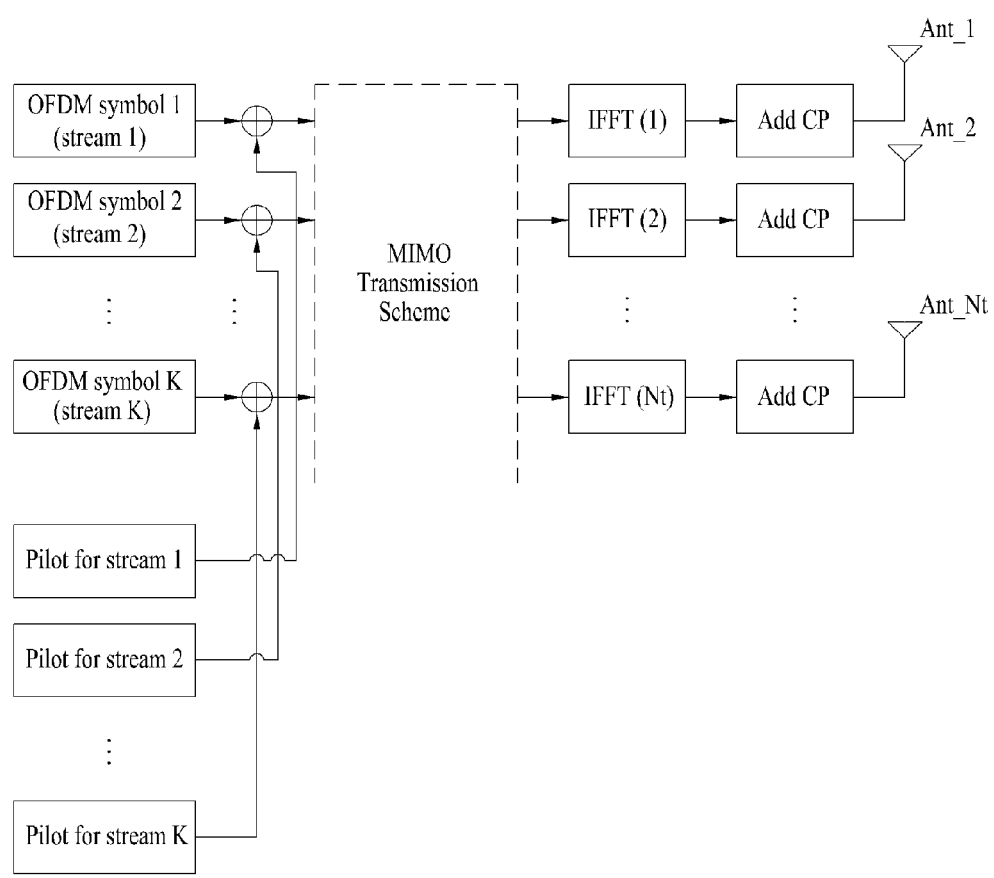
FIG. 12 is a diagram showing the structure of a MIMO transmitter when a precoded RS is used.

A Dedicated Reference Signal (DRS) is mainly used for demodulation and may be defined as a precoded RS and a non-precoded RS. FIG. 12 is a diagram showing the structure of a MIMO transmitter when a precoded RS is used. In FIG. 12, Nt denotes the number of physical antennas and K denotes a spatial multiplexing rate.

As shown in FIG. 12, if a precoded RS is used, an RS is precoded and then transmitted. RSs of a number corresponding to the spatial multiplexing rate K are transmitted. In this case, K is always less than or equal to the number of physical antennas, Nt.

Figure 13:
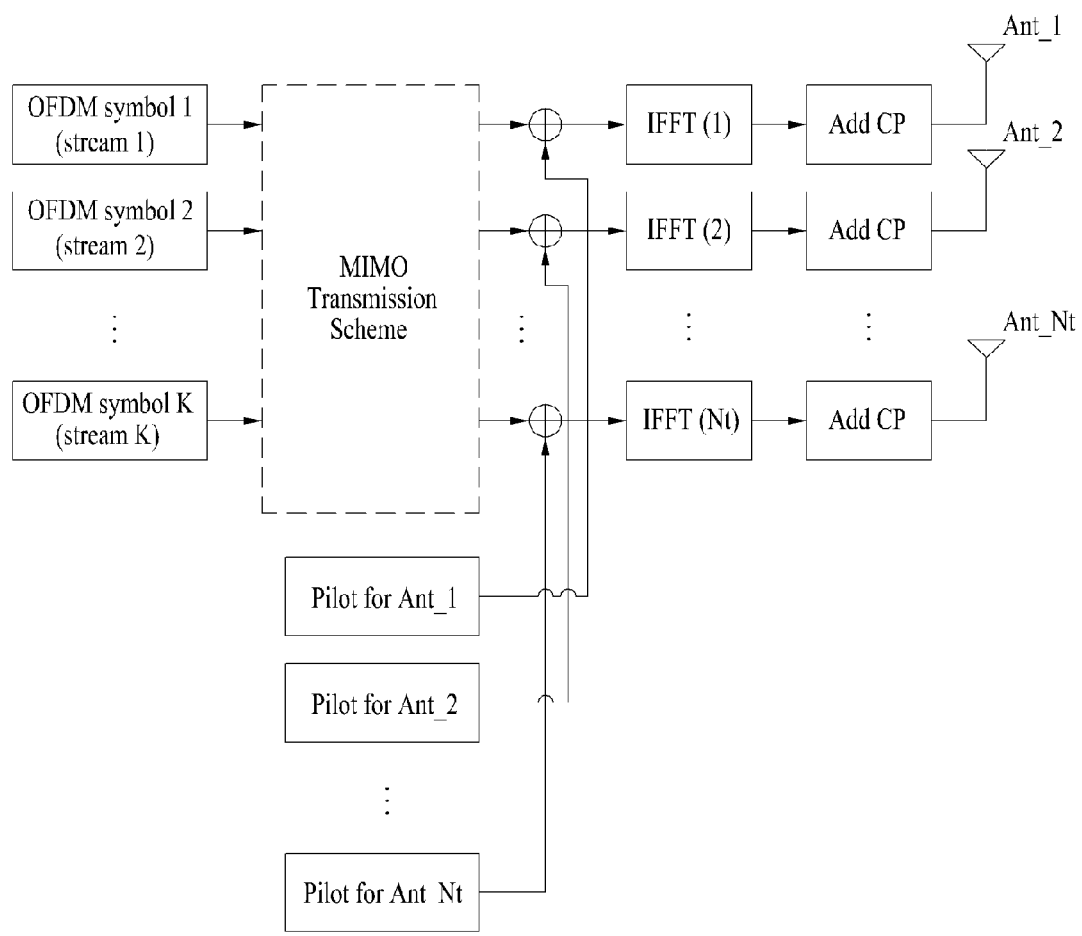
FIG. 13 is a diagram showing the structure of a MIMO transmitter when a CRS is used.

A Common Reference Signal (CRS) may be used for demodulation or measurement and is shared by all UEs. FIG. 13 is a diagram showing the structure of a MIMO transmitter when a CRS is used. As shown in FIG. 13, RSs are transmitted on antennas without being influenced by a MIMO scheme. Accordingly, Nt RSs are always transmitted irrespective of the spatial multiplexing rate of a UE.

Hereinafter, a method will be described which can minimize RS overhead while minimally affecting an existing LTE UE when a CRS and a DRS are used for measurement and demodulation, respectively, in an LTE-A system.

Figure 14:
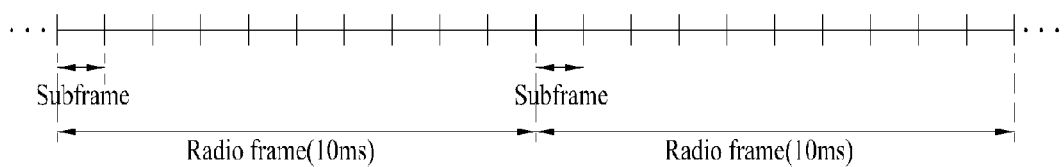
FIG. 14 is a diagram showing the structure of an LTE radio frame.

FIG. 14 is a diagram showing the structure of an LTE radio frame. As shown in FIG. 14, one radio frame includes 10 subframes, each of which has a duration of 1 ms. In an LTE system, CRSs of a zeroth transmission antenna, zeroth and first transmission antennas, or zeroth to third transmission antennas are transmitted according to the number of transmission antennas from the respective transmission antennas and the CRSs can be used for measurement or demodulation. Accordingly, data can be transmitted or received without the aid of a DRS, and precoding information and a rank (or the number of streams or a spatial multiplexing rate), which are used by each UE, should be transmitted through a control channel.

Figure 7:
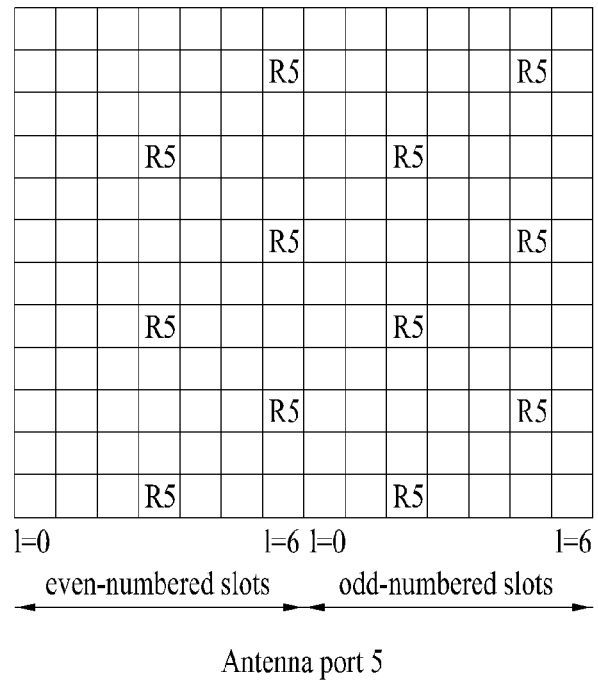
FIG. 7 shows the structure of a UE-specific downlink RS in a subframe using a normal CP in which one TTI has 14 OFDM symbols.
Figure 8:
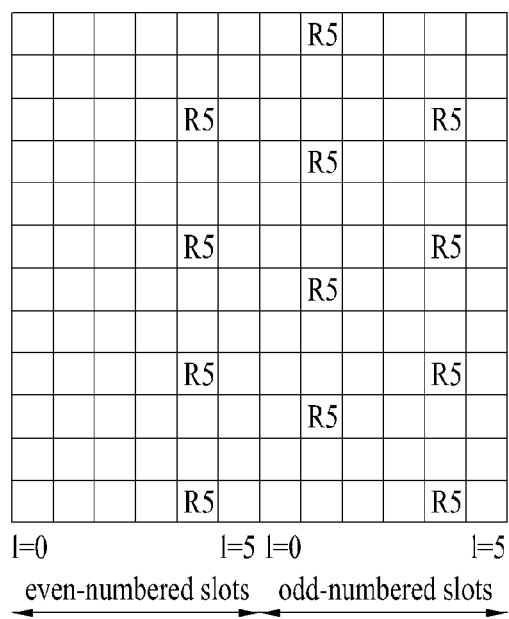
FIG. 8 shows the structure of a UE-specific downlink RS in a subframe using an extended CP in which one TTI has 14 OFDM symbols.
Figure 9:
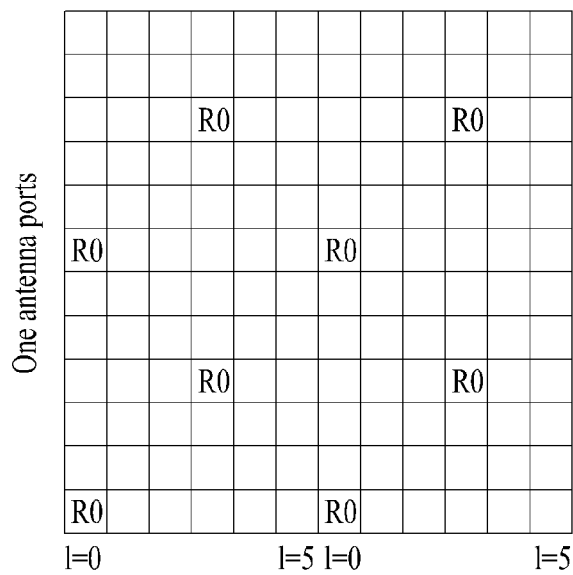
FIGS. 9 to 11 show the structures of UE-common downlink RSs for systems having 1Tx, 2Tx, and 4Tx, respectively, when one TTI has 14 OFDM symbols.
Figure 10:
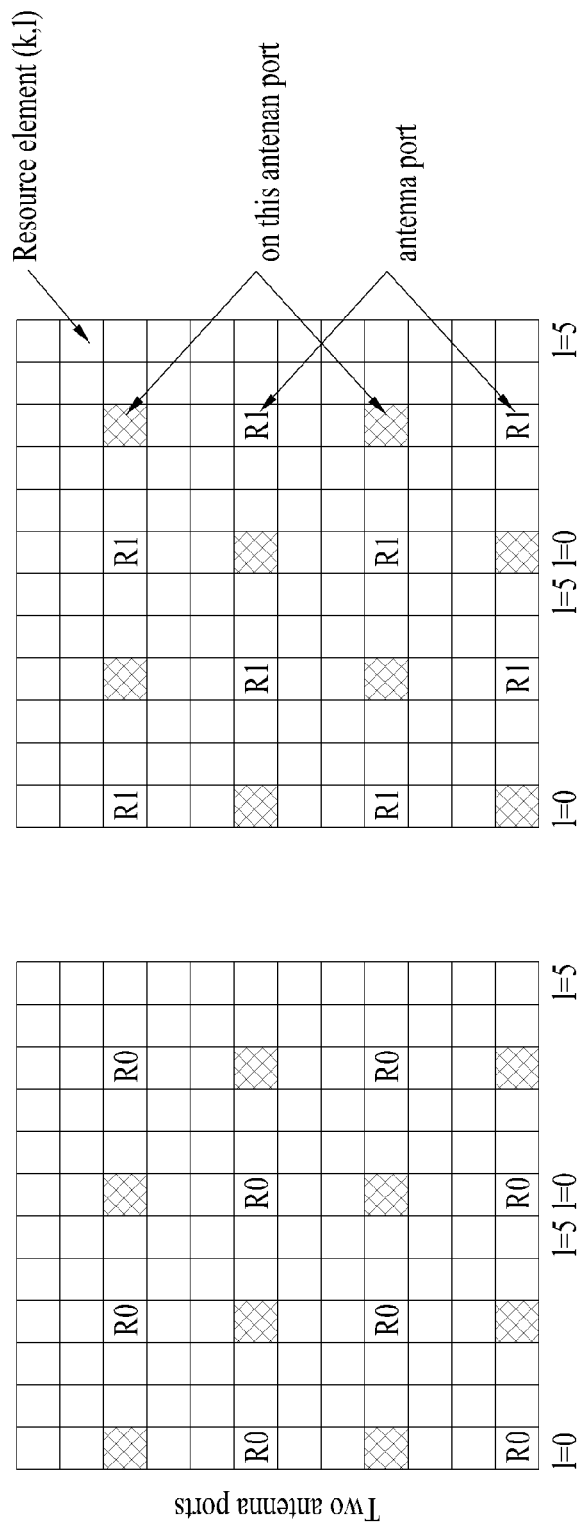
Figure 11:
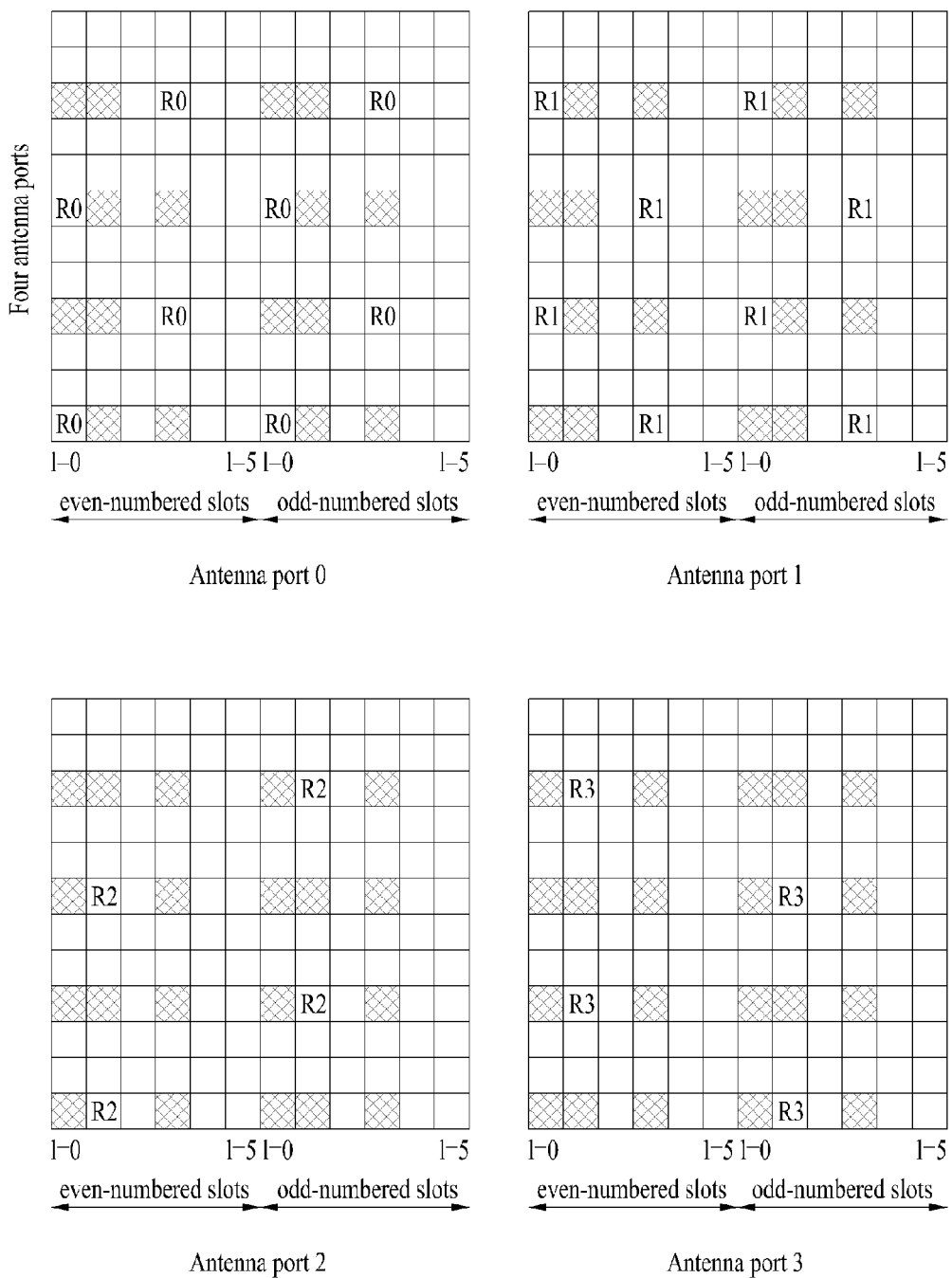

In addition, DRSs shown in FIG. 7 and FIG. 8 may be configured for use in single stream beamforming so as to be transmitted without precoding and rank information.

Figure 15:
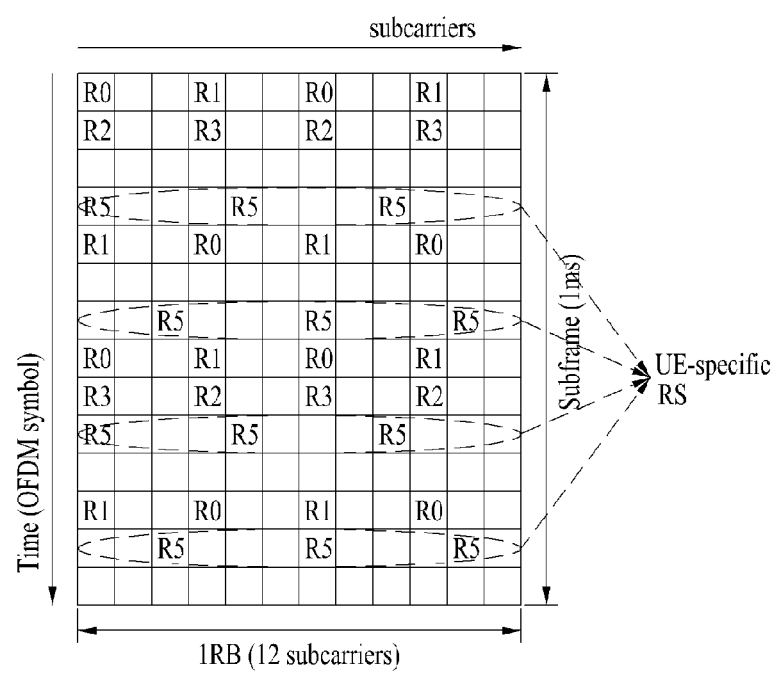
FIG. 15 is a diagram showing an example of an RS structure when a CRS, and a DRS for single stream beamforming are simultaneously used.

However, in the case where a rank is greater than 1, data should be transmitted always using a CRS. FIG. 15 is a diagram showing an example of an RS structure when a CRS, and a DRS for single stream beamforming are simultaneously used. Although FIG. 15 shows CRS transmission through an antenna port 0 to an antenna port 3, the structure of CRS transmission through the antenna port 0, or the antenna ports 0 and 1 may be configured. In FIG. 15, a UE-specific RS has the same meaning as a DRS, and R5 denotes a DRS of an antenna port 5 in an LTE system.

In such an LTE system, antenna ports from 0 to 5 are defined. The antenna ports 0 to 3 are defined for a CRS, and the antenna port 4 is an antenna port for a Multimedia Broadcast over a Single Frequency Network (MBSFN) subframe which is defined for another type of an RS structure. Accordingly, for a maximum of 8 (the number of transmission antennas)×8 (spatial antenna rate) transmissions to an LTE-A UE, DRS antenna ports 0 to 7 and CRS antenna ports 0 to 7 should be additionally defined.

Hereinbelow, antenna ports 0 to 5 of an LTE system will be referred to as LTE port #0~5, and a CRS and a DRS of an LTE-A system are distinguished by LTE-A C_ports #0~7 and D_ports #0~7, respectively. The meaning that an LTE port #5 is the same as an LTE-A D_port #0 indicates that RS locations for the respective antenna ports are the same.

First, CRS transmission is described in conjunction with LTE-A C_ports #0~7.

1. CRS Transmission (LTE-A C_port #0~7)

Figure 16:
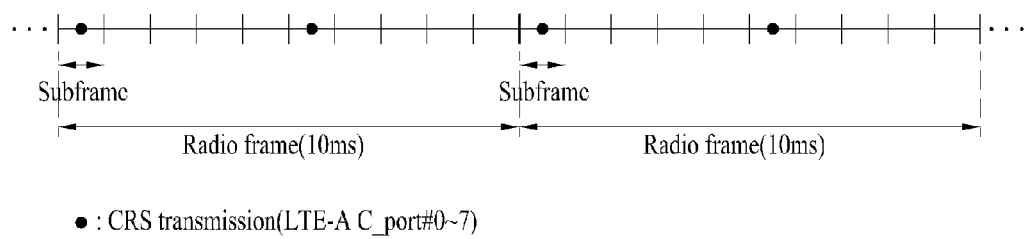
FIG. 16 is a diagram explaining a CRS transmitted at a predetermined cycle in a radio frame.

An LTE-A system may use a precoded DRS for demodulation purposes and a CRS for measurement purposes in order to minimize RS overhead. At this time, the CRS may be configured to be transmitted at a low duty cycle to reduce additional RS overhead. FIG. 16 is a diagram explaining a CRS transmitted at a predetermined cycle in a radio frame. A DRS is transmitted for each UE in every subframe, and a CRS is transmitted at a predetermined cycle as shown in FIG. 16, thereby minimizing additional overhead caused by the CRS, and minimizing RS overhead by transmitting RSs corresponding to the number of streams through DRSs. Although FIG. 16 shows a CRS transmission cycle of 5 ms by way of example, the CRS transmission cycle may be 10 ms, 20 ms, 30 ms, etc. and may be arbitrarily determined by a BS.

Referring to FIG. 16, in all subframes, CRSs of 1Tx (LTE port #0), 2Tx (LTE ports #0~1), and 4Tx (LTE ports #0~3) are always transmitted by the number of transmission antennas for supporting an LTE UE. If an LTE-A UE is assigned, LTE-A D_ports #0~7 are transmitted in a corresponding subframe to which a Physical Downlink Shared Channel (PDSCH) of the corresponding UE is assigned, and LTE-A C_ports #0~7 are transmitted in a corresponding subframe at a time duration determined according to a duty cycle. It is proposed to transmit the LTE-A C_ports #0~7 by the following two methods.

(1) Method for Transmitting CRS by Sharing Antenna Ports with LTE System

If LTE ports #0~3 are always transmitted in all subframes, LTE-A C_ports #0~3 are used in the same way as the LTE port #0~3. In this case, since the LTE ports #0~3 are always transmitted, the LTE-A C_ports #0~3 do not need to be additionally transmitted. Accordingly, only CRS LTE-A C_ports #4~7 may be separately defined and be additionally transmitted. Moreover, if only an LTE port #0 is transmitted or only LTE ports #0~1 are transmitted, only the LTE-A C_port #0 is identically used or only the LTE ports #0~1 are identically used, respectively, and the other CRSs may be additionally defined and transmitted.

(2) Method for Transmitting CRS Independently of Antenna Ports of LTE System

LTE-A C_ports #0~7 may be configured to be always transmitted at a predetermined cycle irrespective of LTE ports #0~3. At this time, all the LTE-A C_ports #0~7 may be transmitted within one subframe at a predetermined cycle or may be transmitted within a plurality of successive subframes. In this case, the LTE-A C_ports may be transmitted in a specific RB or in all RBs. In addition, the LTE-A C_ports #0~7 may be transmitted through a Physical Downlink Control Channel (PDCCH) region or through a Physical Downlink Shared Channel (PDSCH) region. The above respective cases are described through embodiments.

First Embodiment

Hereinafter, a method for transmitting LTE-A C_port #0~7 in one subframe at a duty cycle according to a first embodiment of the present invention will be described.

As shown in FIG. 16, if a transmission cycle of the LTE-A C_ports #0~7 is determined, RSs of the LTE-A C_ports #0~7 are transmitted only in subframes of the corresponding cycle. In this case, the LTE-A C_ports #0~7 in the corresponding subframes may be transmitted through a PDCCH or PDSCH region or may use one of the PDCCH and PDSCH according to a characteristic of the corresponding subframes. A method for transmitting the LTE-A C_ports #0~7 on the PDCCH and PDSCH is as follows.

1) Method for Transmitting LTE-A C_Ports #0~7 Using PDCCH

Figure 1:
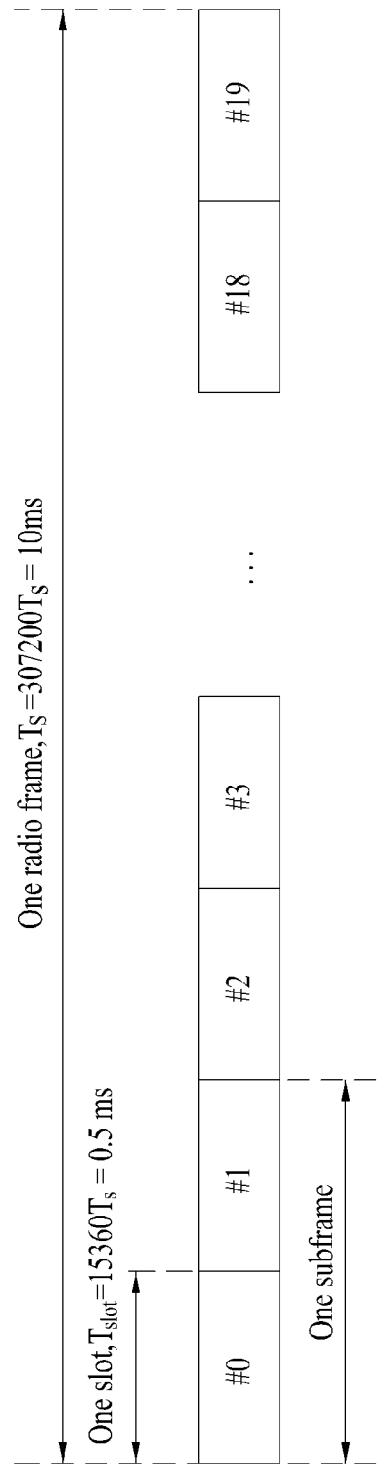
FIG. 1 shows the structure of a type 1 radio frame.
Figure 2:
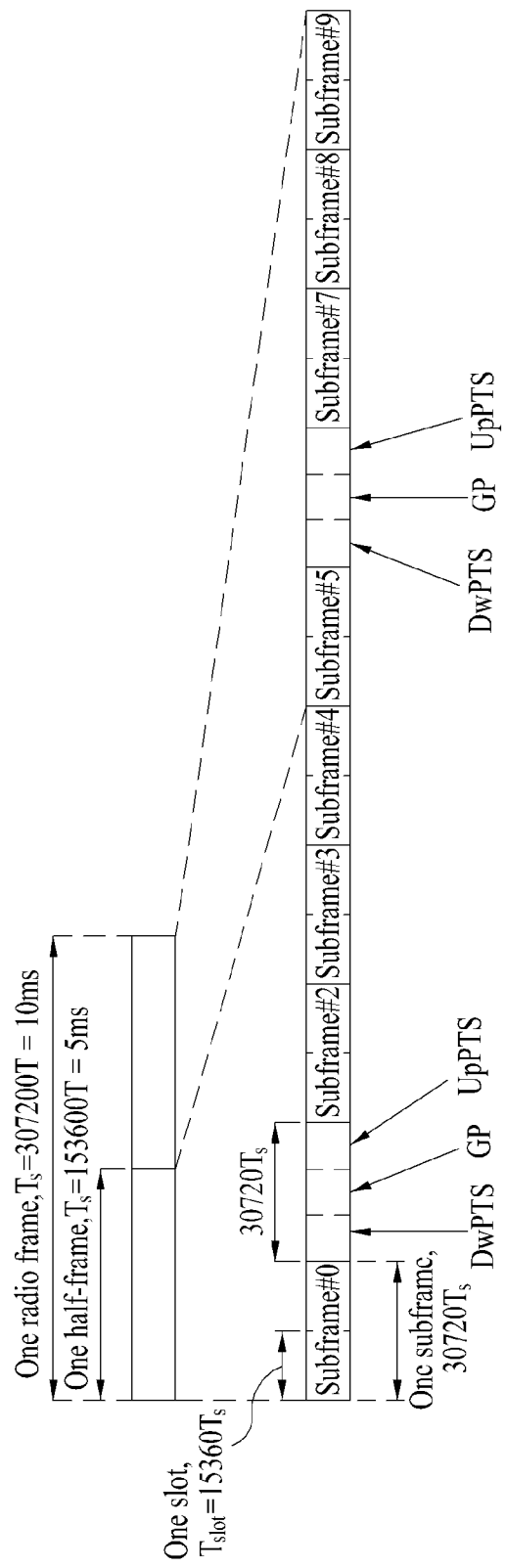
FIG. 2 shows the structure of a type 2 radio frame.
Figure 3:
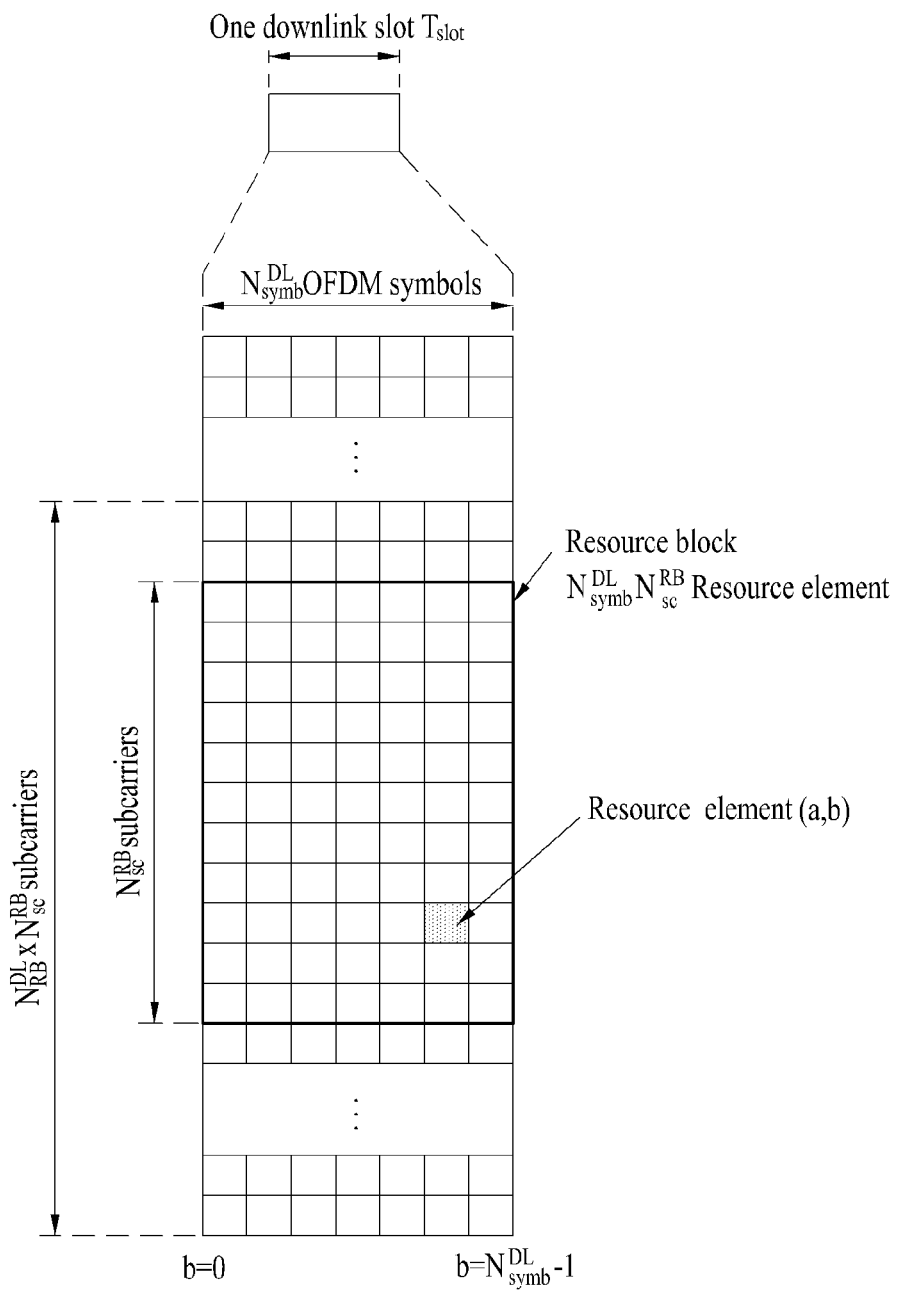
FIG. 3 shows the structure of an LTE downlink slot.
Figure 4:
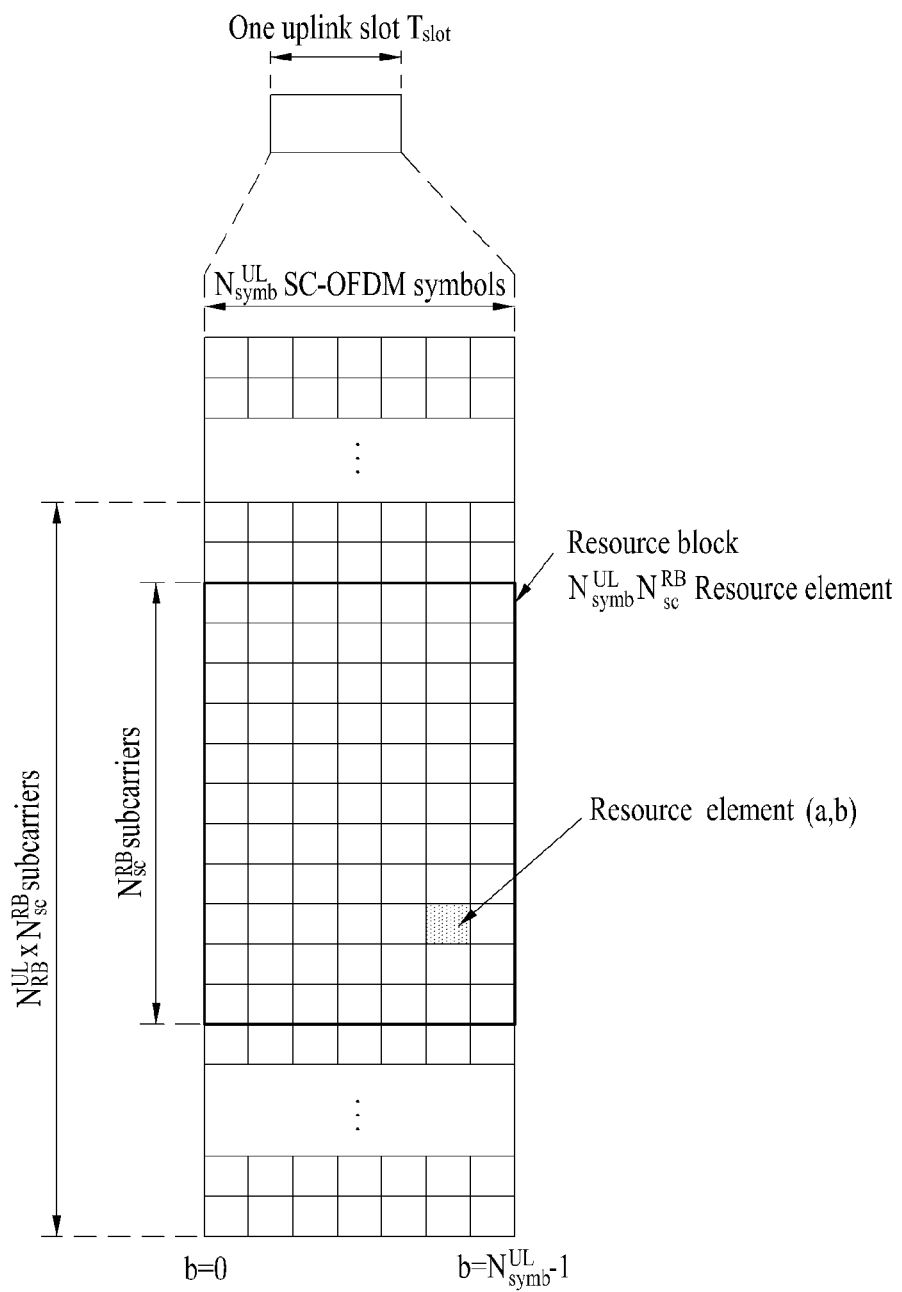
FIG. 4 shows the structure of an LTE uplink slot.
Figure 5:
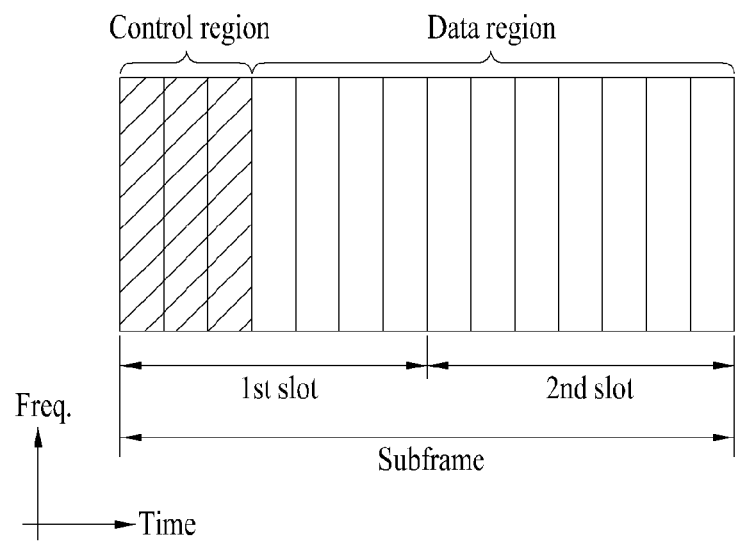
FIG. 5 shows the structure of a downlink subframe.
Figure 6:
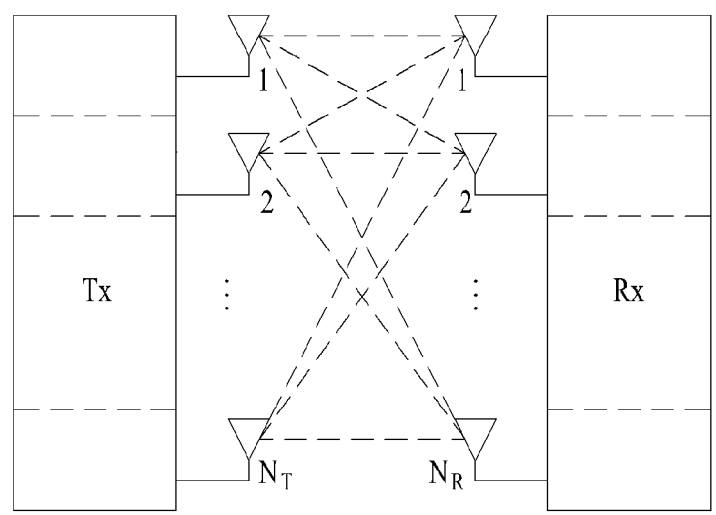
FIG. 6 shows the configuration of a general MIMO communication system.
Figure 17:
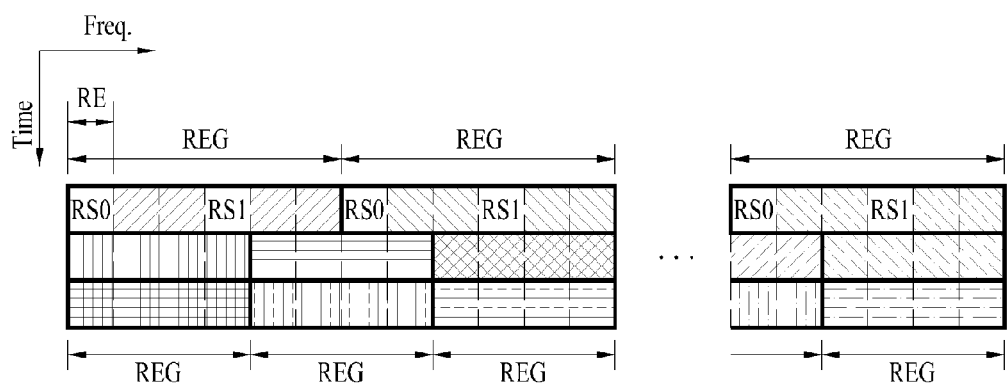
FIG. 17 is a diagram showing the resource structure of a control channel in 1Tx or 2Tx in an LTE system.
Figure 18:
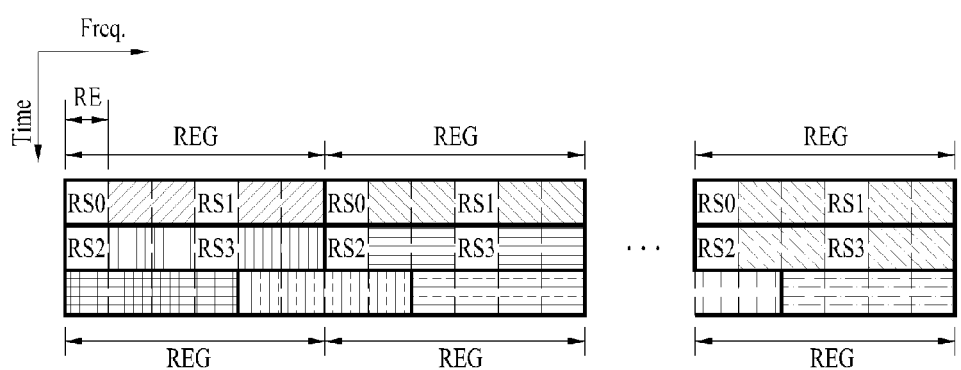
FIG. 18 is a diagram showing the resource structure of a control channel in 4Tx in an LTE system.

FIG. 17 is a diagram showing the resource structure of a control channel in 1Tx or 2Tx in an LTE system. FIG. 18 is a diagram showing the resource structure of a control channel in 4Tx in an LTE system. A resource of a PDCCH region has, as a basic unit, a Resource Element Group (REG) including 4 successive REs except for RSs. A method for configuring an REG differs according to a control channel such as a PDCCH, a PHICH, or a PCFICH. In FIG. 17 and FIG. 18, RS0, RS1, RS2, and RS3 indicate LTE ports #0, 1, 2, and 3, respectively. The first to third OFDM symbols of each subframe may be transmitted for PDCCH transmission. In FIG. 17 and FIG. 18, 3 OFDM symbols are used for PDCCH transmission. A resource allocation unit of a channel for downlink control is a Control Channel Element (CCE) and the CCE includes 9 REGs. Accordingly, if one CCE is allocated for LTE-A ports #0~7, a total of 9 REGs is used for transmission.

Figure 19:
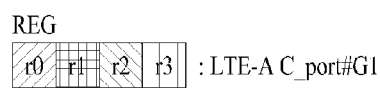
FIG. 19 is a diagram explaining a method of configuring LTE-A C_ports by two groups in units of REGs according to an embodiment of the present invention.
Figure 19:
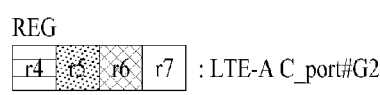

An RS transmission method when LTE-A ports #0~7 are transmitted using the CCE may be configured in various forms. Basically, since 4 LTE-A C_ports can be transmitted on one REG, LTE-A C_ports #0~3 may be defined as an LTE-A C_port #G1 and the other LTE-A C_ports #4~7 may be defined as an LTE-A C_port #G2, for simplicity of implementation. Although G1 indicates LTE-A C_ports #0~3 and G2 indicates LTE-A C_ports #4~7 here, G1 and G2 may represent two independent groups which are configured differently. FIG. 19 is a diagram explaining a method of configuring LTE-A C_ports by two groups in units of REGs according to an embodiment of the present invention.

In FIG. 19, as a method of applying the two groups to CCEs, a method of sequentially switching the groups and a method of applying the groups in units of CCEs may be considered. Alternatively, a method of applying the groups in a reverse order according to a CCE may be used. The most basically used method is a method of sequentially switching G1 and G2 within respective CCEs. For example, assuming that 4 CCEs are used for LTE-A C_ports #0~7, each RS may be mapped to 4 CCEs CCE(1) to CCE(4) as shown below in Table 1. At this time, CCEs may correspond to both logical and physical CCEs.

TABLE 1

|  | REG1 | REG2 | REG3 | REG4 | REG5 | REG6 | REG7 | REG8 | REG9 |
|---|---|---|---|---|---|---|---|---|---|
| CCE(1) | G1 | G2 | G1 | G2 | G1 | G2 | G1 | G2 | G1 |
| CCE(2) | G1 | G2 | G1 | G2 | G1 | G2 | G1 | G2 | G1 |
| CCE(3) | G1 | G2 | G1 | G2 | G1 | G2 | G1 | G2 | G1 |
| CCE(4) | G1 | G2 | G1 | G2 | G1 | G2 | G1 | G2 | G1 |

In Table 1, since one CCE includes odd-numbered REGs, the above method has a disadvantage in that a specific group of LTE-A C_ports transmits relatively fewer RSs. Such a disadvantage can be solved by applying a different start group according to a CCE index as shown below in Table 2.

TABLE 2

|  | REG1 | REG2 | REG3 | REG4 | REG5 | REG6 | REG7 | REG8 | REG9 |
|---|---|---|---|---|---|---|---|---|---|
| CCE(1) | G1 | G2 | G1 | G2 | G1 | G2 | G1 | G2 | G1 |
| CCE(2) | G2 | G1 | G2 | G1 | G2 | G1 | G2 | G1 | G2 |
| CCE(3) | G1 | G2 | G1 | G2 | G1 | G2 | G1 | G2 | G1 |
| CCE(4) | G2 | G1 | G2 | G1 | G2 | G1 | G2 | G1 | G2 |

In Table 2, G1 is a start group in CCE(1) and CCE(3), and G2 is a start group in CCE(2) and CCE(4), so that G1 and G2 are allocated at the same rate in total CCEs and the same amount of RSs are transmitted.

Meanwhile, only a specific group of LTE-A C_ports may be transmitted according to a CCE index as shown below in Table 3.

TABLE 3

|  | REG1 | REG2 | REG3 | REG4 | REG5 | REG6 | REG7 | REG8 | REG9 |
|---|---|---|---|---|---|---|---|---|---|
| CCE(1) | G1 | G1 | G1 | G1 | G1 | G1 | G1 | G1 | G1 |
| CCE(2) | G2 | G2 | G2 | G2 | G2 | G2 | G2 | G2 | G2 |
| CCE(3) | G1 | G1 | G1 | G1 | G1 | G1 | G1 | G1 | G1 |
| CCE(4) | G2 | G2 | G2 | G2 | G2 | G2 | G2 | G2 | G2 |

The above Table 1 to Table 3 show exemplary embodiments and the present invention is not limited thereto. The present invention includes various methods of allocating LTE-A C_ports to CCEs.

2) Method of transmitting C_ports #0~7 using PDSCH

When LTE-A C_ports #0~7 are transmitted to a PDSCH region, since an LTE-A UE is aware of the transmission locations of RSs, specific REs may be determined to transmit LTE-A C_ports without any problem. However, since an LTE UE cannot recognize LTE-A C_ports #0~7, corresponding RSs function as interference in terms of the LTE UE. Accordingly, various methods may be applied to reduce this interference. First, RS power of the LTE-A C_ports #0~7 may be set to be always less than RS power of LTE ports #0~3. As another configuration method, the LTE-A C_ports #0~7 may be divided into one or more groups and a specific LTE-A C_port group may be transmitted on a specific RB. For example, assuming that LTE-A C_ports #0~3 as G1 and LTE-A C_ports #4~7 as G2, the G1 may be transmitted on an n-th RB and the G2 is transmitted on an (n+1)-th RB, in a subframe in which LTE-A C_ports are transmitted. In addition, the LTE-A C_ports #0~7 may be configured to be all transmitted on one specific RB instead of every RB.

Second Embodiment

Hereinafter, a method for transmitting LTE-A C_ports #0~7 in one subframe group at a duty cycle according to a second embodiment of the present invention will be described.

When RSs of all LTE-A C_ports #0~7 are transmitted in one subframe, the number of usable REGs or REs of a PDCCH or PDSCH may be insufficient. Also, the number of LTE-A C_ports #0~7 may need to be reduced in order to solve a problem of a large amount of interference generated from corresponding RSs to the LTE UE. Accordingly, it is proposed to transmit LTE-A C_ports #0~7 by defining one or more subframes or RBs as a group, instead of transmitting all of the LTE-A C_ports #0~7 in one subframe or one RB.

Figure 20:
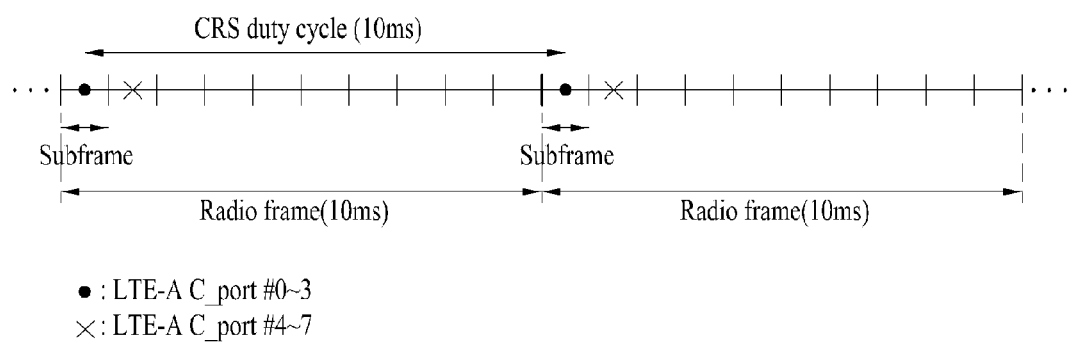
FIG. 20 is a diagram showing the structure of a radio frame for transmitting LTE-A C_ports #0~7 using a group consisting of at least one or more subframes according to an embodiment of the present invention.

FIG. 20 is a diagram showing the structure of a radio frame for transmitting LTE-A C_ports #0~7 using a group consisting of at least one or more subframes according to an embodiment of the present invention. In FIG. 20, a duty cycle may be determined based on a start subframe of a group.

In FIG. 20, two subframes are defined as one group. LTE-A C_ports #0~3 are transmitted in the first subframe of one group and LTE-A C_ports #0~7 are transmitted in the second subframe of the one group. However, independent antenna ports may be configured as a group. If N subframes are determined as a group, N subframes consisting of 8/N independent antennas may be configured as a group. When applying this method, the method of Embodiment 1 for transmitting LTE-A C_ports #0~7 on the PDCCH and PDSCH may be applied. Although all N antenna port groups are transmitted at the same duty cycle, each antenna port group may have an offset of an integral value based on the first port group and a CRS may be transmitted after subframes of a number corresponding to the offset. In this case, CRS patterns for respective subframes may be the same or different.

Figure 22:
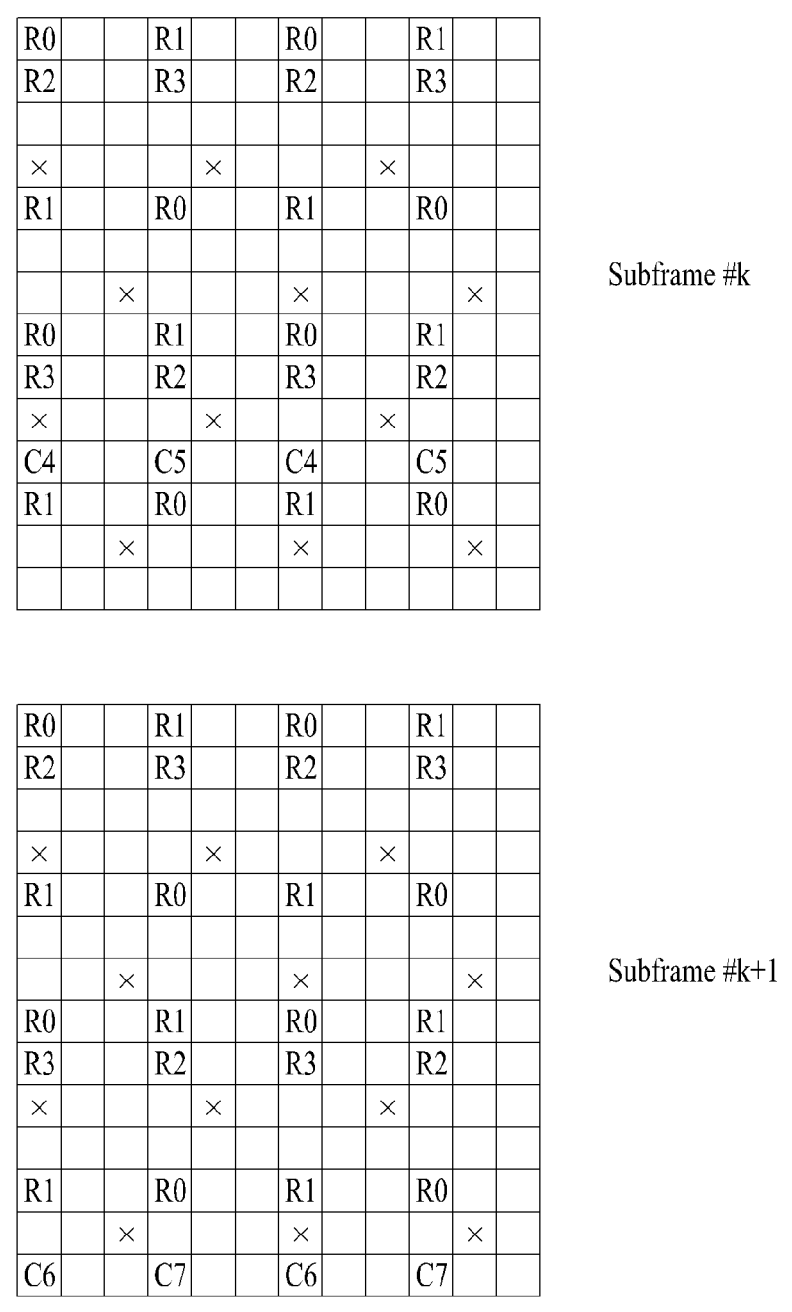

FIG. 21 is a diagram showing transmission of LTE-A C_ports #0~7 using one subframe, and FIG. 22 is a diagram showing the structure of RSs when transmitting LTE-A C_ports #0~7 using a plurality of subframes according to an embodiment of the present invention. LTE-A CRSs (denoted by C4 to C7 in FIG. 21) included in one subframe in FIG. 21 are divided into two groups in FIG. 22 and the LTE-A CRSs included in each group are transmitted in two successive subframes.

Figure 23:
FIG. 23 is a diagram showing an RS structure when transmitting LTE-A C_ports #0~7 using a plurality of RBs according to an embodiment of the present invention.
Figure 23:

FIG. 23 is a diagram showing an RS structure when transmitting LTE-A C_ports #0~7 using a plurality of RBs according to an embodiment of the present invention. In more detail, FIG. 23 shows an RS structure when LTE-A C_ports #0~3 are transmitted in one of two RBs and LTE-A C_ports #4~7 are transmitted in the other RB.

As shown in FIG. 23, CRS group 1 (e.g., C_ports #0~3) may be transmitted in an RB #n and CRS group 2 (e.g., C_ports #4~7) may be transmitted in an RB #n+1. In FIG. 23, the number and locations of LTE-A CRSs per RB are changeable and N CRS groups may be configured. For the N CRS groups, N RBs may be designated and transmitted. In addition, if the N CRS groups are configured, the number of C_ports for each CRS group may be different and the number of LTE-A CRSs allocated to each CRS group may be different.

Figure 24:
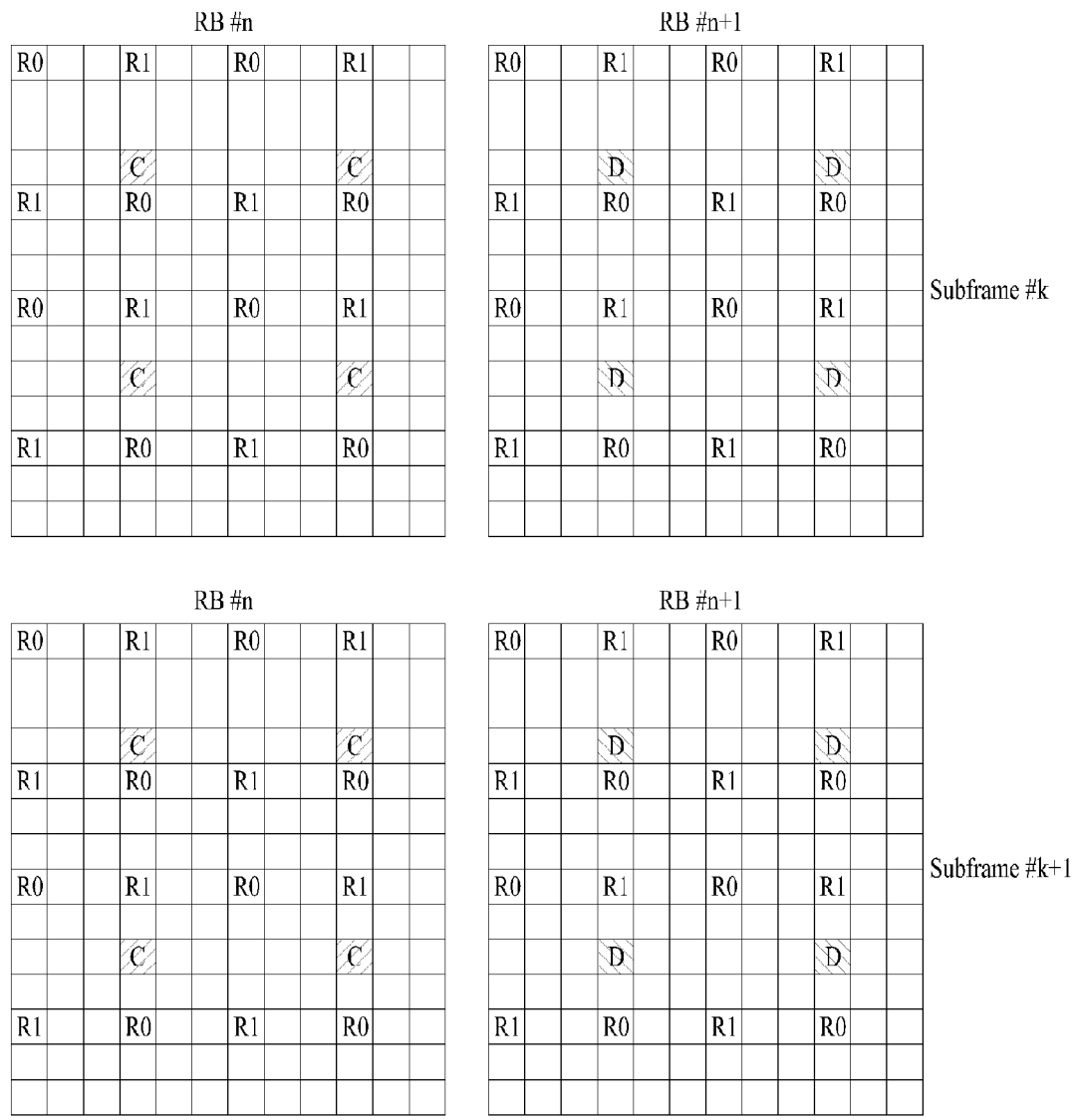
FIG. 24 is a diagram showing an RS structure when transmitting LTE-A C_ports #0~7 using a plurality of subframes and a plurality of RBs according to an embodiment of the present invention.

FIG. 24 is a diagram showing an RS structure when transmitting LTE-A C_ports #0~7 using a plurality of subframes and a plurality of RBs according to an embodiment of the present invention. As shown in FIG. 24, a plurality of subframes and a plurality of RBs may be configured as groups for transmitting LTE-A C_ports #0~7. In FIG. 24, a CRS group 1 (e.g., C_ports #0~3) is transmitted in an RB #n of a subframe #k, a CRS group 2 (e.g., C_ports #4~7) is transmitted in an RB #n+1 of the subframe #k, the CRS group 1 (e.g., C_ports #0~3) is transmitted in an RB #1 of a subframe #k+1, and the CRS group 2 (e.g., C_ports #4~7) is transmitted in an RB #n+1 of the subframe #k+1.

Figure 25:
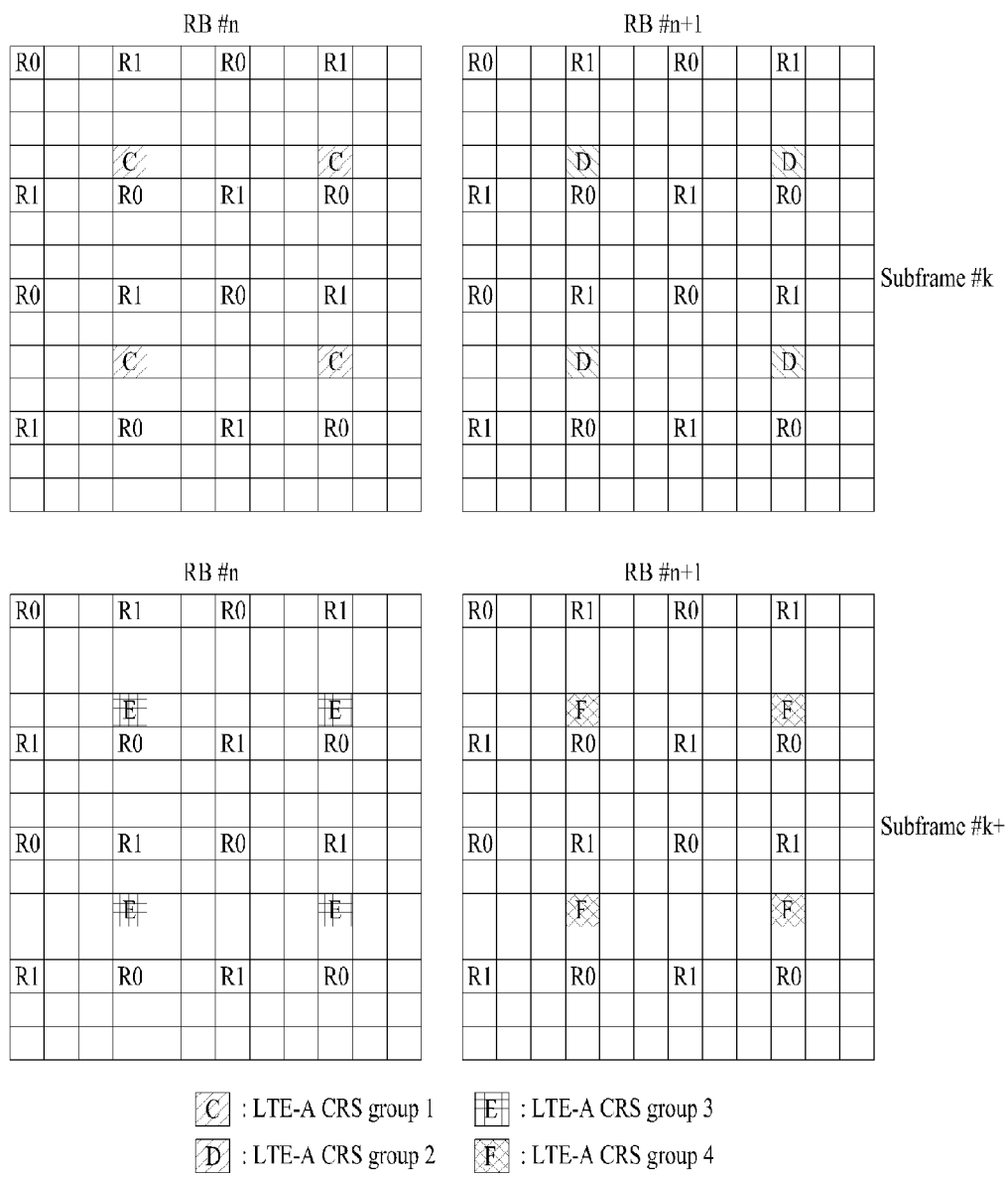
FIG. 25 is a diagram showing an RS structure when transmitting LTE-A C_ports #0~7 using a plurality of subframes and a plurality of RBs according to an embodiment of the present invention.

FIG. 25 is a diagram showing an RS structure when transmitting LTE-A C_ports #0~7 using a plurality of subframes and a plurality of RBs according to an embodiment of the present invention. As shown in FIG. 25, an RB #1 and an RB #2 of a subframe #k and an RB #1 and an RB #2 of a subframe #k+1 are allocated to LTE-A CRS groups 1 to 4, respectively, thereby forming one group. At this time, different CRS groups are mapped to the respective RBs.

Figure 26:
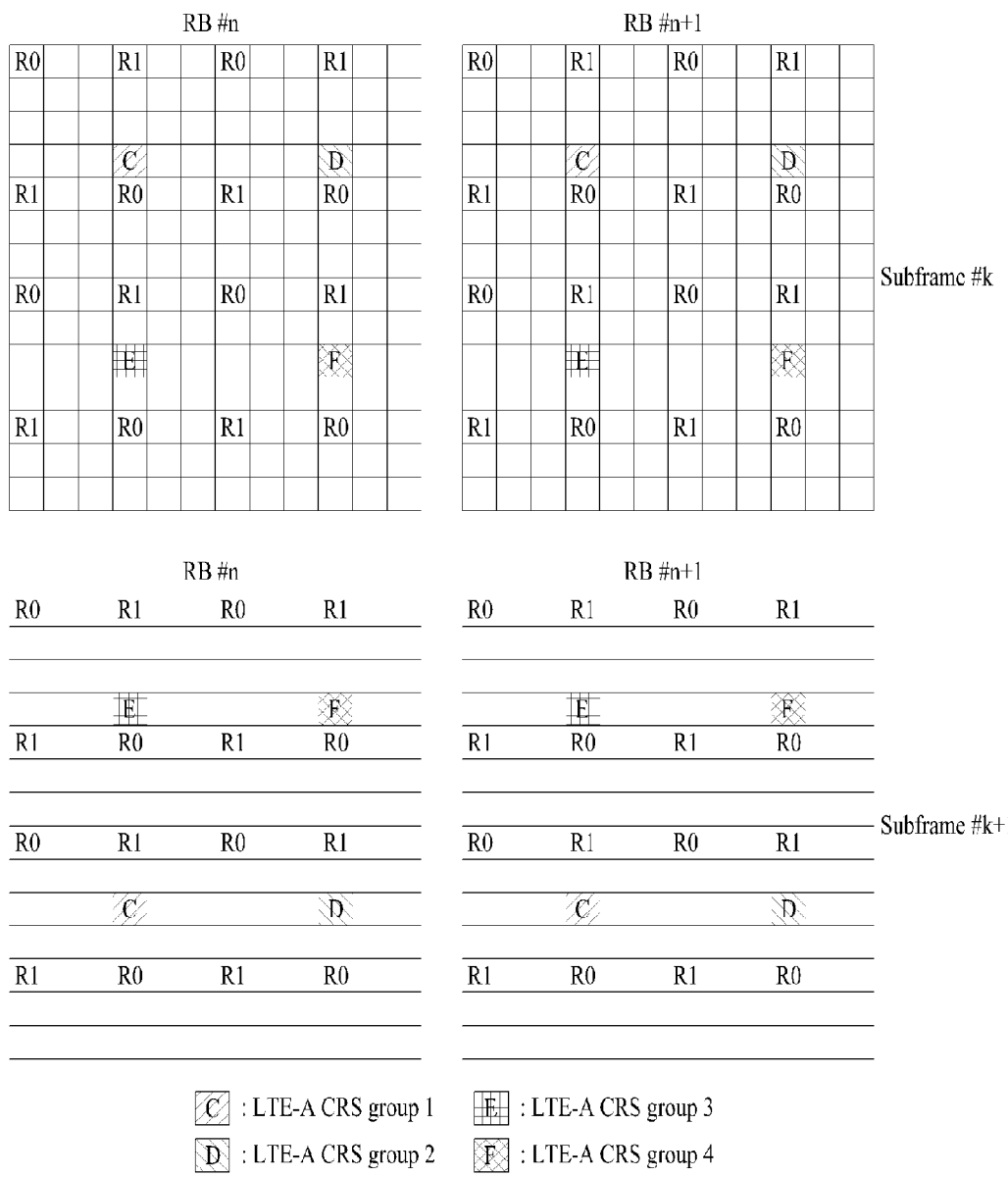
FIG. 26 is a diagram showing an RS structure when transmitting LTE-A C_ports #0~7 using a plurality of subframes and a plurality of RBs according to an embodiment of the present invention.

FIG. 26 is a diagram showing an RS structure when transmitting LTE-A C_ports #0~7 using a plurality of subframes and a plurality of RBs according to an embodiment of the present invention. In particular, FIG. 26 shows the structure in which CRSs included in 4 CRS groups are distributively mapped to a plurality of subframes and a plurality of RBs. Although 4 groups are shown by way of example in FIG. 24, FIG. 26 may be applied to N CRS groups.

In addition, subframe locations of an antenna port group may be swapped every duty cycle or m (where m is an integer) duty cycles. If the number of antenna port groups is 3 or more, subframe locations may be cyclically changed.

The following Table 4 shows the configuration of uplink and downlink subframes of a Rel-8 TDD system. As opposed to an FDD system, it can be appreciated that subframes which can transmit downlink CSI-RSs in one radio frame are limited.

TABLE 4

| Uplink-downlink configuration | Downlink-to-uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 4, D denotes a downlink subframe, U denotes an uplink subframe, and S denotes a special subframe. To transmit two or more antenna port groups within one duty cycle, an applicable configuration and a non-applicable configuration may be separately used according to downlink and uplink configurations of Table 4. For example, in configurations 3, 4, and 5, RSs may be transmitted through one or more subframes using multiple antenna groups and in the other configurations, RSs of all transmission antennas may be transmitted in one downlink subframe D without determining antenna port groups. Alternatively, RSs may be transmitted using a special subframe S as in the downlink subframe D.

As shown in Table 4, a switch-point periodicity may be differently set according to a configuration. In this case, a minimum duty cycle may be equal to or greater than the switch-point periodicity.

Meanwhile, the fowling Table 5 explains locations of antenna ports transmitted according to locations of respective subframes when N subframes are determined as a group. In Table 5, it is assumed that two subframes are allocated as a group and two CCEs are used for each subframe.

TABLE 5

| | REG1 | REG2 | REG3 | REG4 | REG5 | REG6 | REG7 | REG8 | REG9 |
|---|---|---|---|---|---|---|---|---|---|
| CCE(1) 1$^{st}$ subframe | G1 | G1 | G1 | G1 | G1 | G1 | G1 | G1 | G1 |
| CCE(2) 1$^{st}$ subframe | G1 | G1 | G1 | G1 | G1 | G1 | G1 | G1 | G1 |
| CCE(1) 2$^{nd}$ subframe | G2 | G2 | G2 | G2 | G2 | G2 | G2 | G2 | G2 |
| CCE(2) 2$^{nd}$ subframe | G2 | G2 | G2 | G2 | G2 | G2 | G2 | G2 | G2 |

In the method shown in Table 5, a specific LTE-A C_port group is transmitted on all CCEs irrespective of the number of CCEs in a corresponding subframe. Here, G1 may denote LTE-A C_ports #0~3 and G2 may denote LTE-A C_ports

4~7, or may denote two groups, each of which consists of an independent antenna group which is different from the above form.

Figure 27:
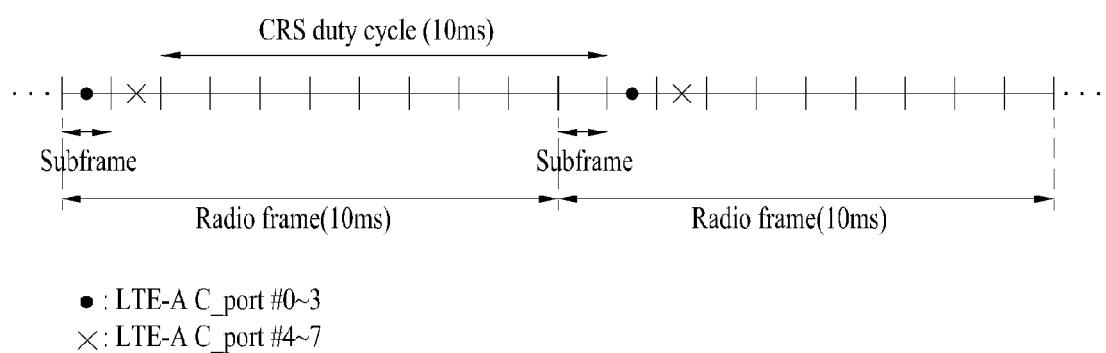
FIG. 27 is a diagram showing the structure of a radio frame for transmitting LTE-A C_ports #0~7 using a group consisting of at least one or more subframes according to an embodiment of the present invention.

FIG. 27 is a diagram showing the structure of a radio frame for transmitting LTE-A C_ports #0~7 using a group consisting of at least one or more subframes according to an embodiment of the present invention. In FIG. 22, a duty cycle is configured based on the first subframe of a group. However, in FIG. 27, a duty cycle is configured based on the last subframe of a previous group and the first subframe of a group of a next cycle.

Among the above methods, G1 and G2 transmitted within subframe groups may use the same CCEs in different subframes or may use RE locations of the same PDSCH. Alternatively, G1 and G2 may be configured to be orthogonal. G1 and G2 are not limited to a method for dividing them into two groups and may use LTE-A C_ports #0~7 by dividing them into N groups.

Third Embodiment

If LTE-A C_ports #0~7, which are all CRS antenna ports, are transmitted in one subframe as in the first embodiment, channel estimation performance needs to be improved because of minimum RS overhead configuration within the subframe in order to minimize interference with an LTE UE. Accordingly, the present embodiment proposes repeated CRS transmission during k subframes to improve channel estimation performance while using the configuration of the first embodiment. k is set to one of 1 to K (where K>1) and k=1 means CRS transmission during one subframe without repetition.

This embodiment may apply all the methods described in the first embodiment. Also, a duty cycle may be configured as shown in FIG. 20 and FIG. 27 by considering k subframes as one group. In this case, CRS patterns of subframes being repeated may be the same or may be shifted along a frequency or time axis. Alternatively, they may be swapped between CRS groups.

Meanwhile, a method for configuring an LTE-A only subframe using an MBSFN subframe will be described. The LTE-A only subframe is defined as a subframe supporting an LTE-A UE. In an LTE system, an MBSFN subframe has been defined and, in the MBSFN subframe, the LTE UE is configured to be unable to transmit a PDSCH. However, it is possible to transmit a control channel to zeroth and first OFDM symbols of a subframe. Therefore, if the MBSFN subframe is set to transmit an LTE-A PDSCH, an LTE-A UE is capable of transmitting and receiving data using LTE-A C_ports #0~7 and LTE-A D_ports #0~7 without any influence by LTE ports #0~3. Accordingly, a BS may cause an LTE UE to define a corresponding subframe as an MBSFN subframe and cause an LTE-A UE to define a corresponding subframe as an LTE-A only subframe in which PDSCH transmission can be performed. In this case, since LTE ports #0~3 are absent in a PDSCH region, LTE-A D_ports #0~7 for the LTE-A UE may be transmitted according to rank, the number of layers, and a spatial multiplexing rate of each UE and the LTE-A UE may demodulate the LTE-A D_ports #0~7 using them.

In this case, a CRS is transmitted at a duty cycle. When a plurality of subframes are grouped during transmission of LTE-A C_ports #0~7 as in the above-described embodiments, G1 and G2 are transmitted in specific subframes within a group, and if an LTE-A only subframe is present in a duty cycle, G1 and G2 may be transmitted altogether. For example, while LTE-A C_ports #0~3 are transmitted as G1 in the first subframe of a subframe group and LTE-A C_ports #0~4 are transmitted as G2 in the other subframes, they may be simultaneously transmitted in an LTE-A only subframe. At this time, the respective groups G1 and G2 should be designed to be orthogonal in time and frequency domains or a code domain.

Up to now, transmission of LTE-A C ports #0~7 has been described. Hereinbelow, transmission of LTE-A DRSs will be described.

2. DRS Transmission (LTE-A D_ports #0~7)

Hereinafter, a method for appropriately combining a 'precoded DRS' and a 'non-precoded DRS' according to a subframe or according to a rank, the number of layers, or a spatial multiplexing rate will be described.

In addition, to minimize overhead of LTE-A D_ports #0~7, a rank may be limited according to an LTE-A UE or a radio frame. The 'precoded DRS' and 'non-precoded DRS' may be configured as shown in the following Table 6.

In addition, to minimize overhead of LTE-A D_ports #0~7, a rank may be limited according to an LTE-A UE or a radio frame. The 'precoded DRS' and 'non-precoded DRS' may be configured as shown in the following Table 6.

TABLE 6

|  | LTE-A only subframe | Other subframes |
| --- | --- | --- |
| Precoded DRS | For all layers (rank 1~rank 7) | Up to 4 layers (i.e., rank 1~rank 4) |
| Non-precoded DRS | None | Higher than 4 layers (i.e., rank 5~rank 8) |

If a system is configured as shown in Table 6, in an LTE-A only subframe, LTE-A D_ports #0~7 are configured independently of LTE ports #0~3. In the other subframes, LTE-A D_ports #0~3 are shared with LTE ports #0~3 when ranks 5 to 8 should be supported, and the other LTE-A D_ports #4~7 are transmitted without being precoded. Accordingly, channels of a total of 8 transmission antennas can be received. However, in this case, precoding information and rank information should be transmitted to a UE.

If the above method is applied, the system may be complicated. However, if the maximum number of layers which can be received by an LTE-A UE in a subframe is limited to 4, DRS overhead can be reduced without using the 'non-precoded DRS' in Table 6. Accordingly, as shown in the following Table 7, the LTE-A UE may transmit a maximum of 8 layers only in the LTE-A only subframe and may transmit a maximum of 4 layers in the other subframes.

TABLE 7

|  | LTE-A only subframe | Other subframes |
| --- | --- | --- |
| Precoded DRS | Up to 8 layers (rank 1~rank 7) | Up to 4 layers (i.e., rank 1~rank 4) |
| Non-precoded DRS | None | None |

Figure 28:
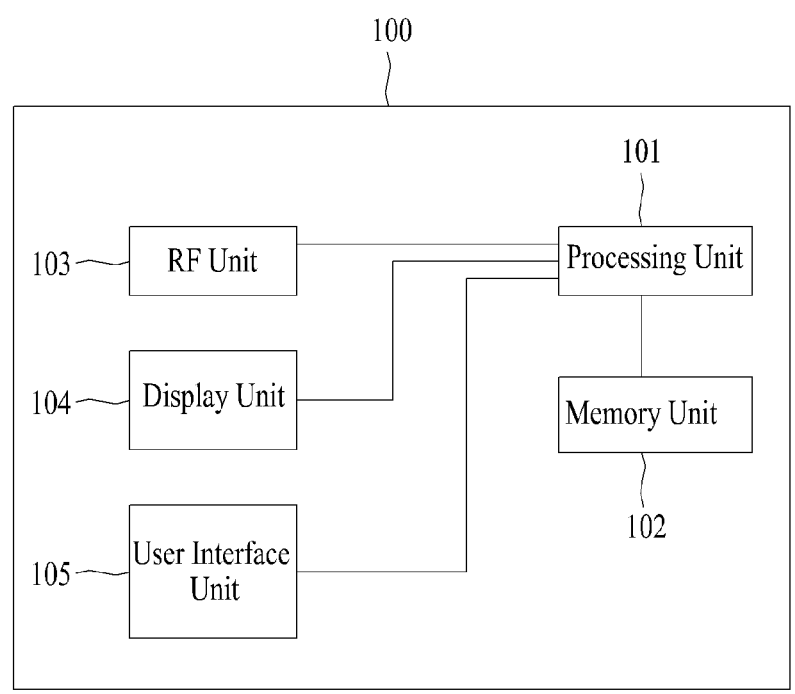
FIG. 28 is a block diagram showing the configuration of a device which is applicable to a BS and a UE and through which the above embodiments can be implemented.

FIG. 28 is a block diagram showing the configuration of a device which is applicable to a BS and a UE and through which the above embodiments can be implemented. As shown in FIG. 28, a device 100 includes a processing unit 101, a memory unit 102, a Radio Frequency (RF) unit 103, a display unit 104, and a user interface unit 105. A layer of a physical interface protocol is performed in the processing unit 101. The processing unit 101 provides a control plane and a user plane. A function of each layer may be performed in the processing unit 101. The memory unit 102 is electrically connected to the processing unit 101 and stores an operating system, applications, and general files. If the device 101 is a UE, the display unit 104 may display a variety of information and may be achieved using a known Liquid Crystal Display (LCD), an Organic Light Emitting Diode (OLED), etc. The user interface 105 may be configured by combination with a known user interface such as a keypad or a touchscreen. The RF unit 103 is electrically connected to the processing unit 101 and transmits or receives radio signals.

The aforementioned embodiments are achieved by combination of elements and features of the present invention in a predetermined manner. Each of the elements or features should be considered selectively unless specified separately. Each of the elements or features may be carried out without being combined with other elements or features. Also, some elements and/or features may be combined with one another to constitute the embodiments of the present invention. The order of operations described in the embodiments of the present invention may be changed. Some elements or features of one embodiment may be included in another embodiment, or may be replaced with corresponding structural elements or features of another embodiment. It will be apparent that claims which are not explicitly dependent on each other can be combined to provide an embodiment or new claims can be added through amendment after this application is filed.

In the present invention, User Equipment (UE) may be replaced with terms such as Mobile Station (MS), Subscriber Station (SS), Mobile Subscriber Station (MSS), Mobile Terminal (MT), etc.

Meanwhile, a UE in the present invention may include a Personal Digital Assistant (PDA), a cellular phone, a Personal Communication Service (PCS) phone, a Global System for Mobile (GSM) phone, a Wideband CDMA (WCDMA) phone, and a Mobile Broadband System (MBS) phone.

MODE FOR INVENTION

The embodiments according to the present invention can be implemented by various means, for example, hardware, firmware, software, or combination thereof.

If the embodiment according to the present invention is implemented by hardware, the embodiment of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

If the embodiment according to the present invention is implemented by firmware or software, the method according to the embodiments of the present invention can be implemented by a type of a module, a procedure, or a function, which performs functions or operations described above. For example, software code may be stored in a memory unit and then may be executed by a processor. The memory unit may be located inside or outside the processor to transmit and receive data to and from the processor through various means which are well known.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. Also, claims which are not explicitly dependent on each other can be combined to provide an embodiment or new claims can be added through amendment after this application is filed.

INDUSTRIAL APPLICABILITY

The present invention may be used for a UE, a BS, or other devices of a radio mobile communication system.

What is claimed is:

1. A method for transmitting, by a base station, a reference signal to a user equipment, the method comprising:
    transmitting legacy reference signals of legacy antenna port 0, legacy antenna ports 0 and 1 or legacy antenna ports 0 to 3 in every downlink subframe; and
    transmitting a new reference signal of a new antenna port in each of consecutive multiple downlink subframes, the new antenna port not being a legacy antenna port,
    wherein the consecutive multiple downlink subframes with the new reference signal occurs at a specific cycle,
    wherein the specific cycle is larger than a number of the consecutive multiple downlink subframes with the new reference signal, and
    wherein the new reference signal is transmitted only in the consecutive multiple downlink subframes at the specific cycle.

2. The method of claim 1, wherein:
    each of the consecutive multiple downlink subframes is divided into a control region for physical downlink control channel transmission and a data region for physical downlink shared channel transmission along a time axis, and
    the new reference signal is transmitted only in the data region in each of the consecutive multiple downlink subframes.

3. The method of claim 1, wherein the new reference signal is transmitted only on a specific resource block in each of the consecutive multiple downlink subframes.

4. The method of claim 1, further comprising:
    transmitting information on the specific cycle.

5. The method of claim 1, wherein the specific cycle is 10*k subframes, where k is an integer larger than 1.

6. A method for receiving, by a user equipment, a reference signal, the method comprising:
    receiving, by the user equipment, legacy reference signals of legacy antenna port 0, legacy antenna ports 0 and 1 or legacy antenna ports 0 to 3 in every downlink subframe; and
    receiving, by the user equipment, a new reference signal of a new antenna port in each of consecutive multiple downlink subframes, the new antenna port not being a legacy antenna port,
    wherein the consecutive multiple downlink subframes with the new reference signal occurs at a specific cycle,
    wherein the specific cycle is larger than a number of the consecutive multiple downlink subframes with the new reference signal, and
    wherein the new reference signal is transmitted only in the consecutive multiple downlink subframes at the specific cycle.

7. The method of claim 6, wherein:
    each of the consecutive multiple downlink subframes is divided into a control region for physical downlink control channel transmission and a data region for physical downlink shared channel transmission along a time axis, and the new reference signal is received only in the data region in each of the consecutive multiple downlink subframes.

8. The method of claim 6, wherein the new reference signal is received only on a specific resource block in each of the consecutive multiple downlink subframes.

9. The method of claim 6, further comprising: receiving information on the specific cycle.

10. The base station of claim 6, wherein the specific cycle is 10*k subframes, where k is an integer larger than 1.

11. A base station comprising:
a processing unit; and
a radio frequency unit electrically connected to the processing unit; and configured to
transmit legacy reference signals of legacy antenna port 0, legacy antenna ports 0 and 1 or legacy antenna ports 0 to 3 in every downlink subframe; and
transmit a new reference signal of a new antenna port in each of consecutive multiple downlink subframes, the new antenna port not being a legacy antenna port,
wherein the consecutive multiple downlink subframes with the new reference signal occurs at a specific cycle,
wherein the specific cycle is larger than a number of the consecutive multiple downlink subframes with the new reference signal, and
wherein the new reference signal is transmitted only in the consecutive multiple downlink subframes at the specific cycle.

12. The base station of claim 11, wherein:
each of the consecutive multiple downlink subframes is divided into a control region for physical downlink control channel transmission and a data region for physical downlink shared channel transmission along a time axis, and
the new reference signal is transmitted only in the data region in each of the consecutive multiple downlink subframes.

13. The base station of claim 11, wherein the new reference signal is only transmitted on a specific resource block in each of the consecutive multiple downlink subframes.

14. The base station of claim 11, wherein the radio frequency unit is configured to further transmit information on the specific cycle.

15. The method of claim 11, wherein the specific cycle is 10*k subframes, where k is an integer larger than 1.

16. A user equipment, comprising:
a processing unit; and
a radio frequency unit electrically connected to the processing unit and configured to
receive legacy reference signals of legacy antenna port 0, legacy antenna ports 0 and 1 or legacy antenna ports 0 to 3 in every downlink subframe, and
receive a new reference signal of a new antenna port in each of consecutive multiple downlink subframes, the new antenna port not being a legacy antenna port,
wherein the consecutive multiple downlink subframes with the new reference signal occurs at a specific cycle,
wherein the specific cycle is larger than a number of the consecutive multiple downlink subframes with the new reference signal, and
wherein the new reference signal is transmitted only in the consecutive multiple downlink subframes at the specific cycle.

17. The user equipment of claim 16, wherein:
each of the consecutive multiple downlink subframes is divided into a control region for physical downlink control channel transmission and a data region for physical downlink shared channel transmission along a time axis, and
the new reference signal is received only in the data region in each of the consecutive multiple downlink subframes.

18. The user equipment of claim 16, wherein the new reference signal is received only on a specific resource block in each of the consecutive multiple downlink subframes.

19. The user equipment of claim 16, wherein the radio frequency unit is configured to further receive information on the specific cycle.

20. The user equipment claim 16, wherein the specific cycle is 10*k subframes, where k is an integer larger than 1.

* * * * *